United States Patent
Hoya et al.

(10) Patent No.: US 9,489,591 B2
(45) Date of Patent: Nov. 8, 2016

(54) HAZE IMAGE DISCRIMINATING APPARATUS AND DISCRIMINATING METHOD

(71) Applicant: SOCIONEXT INC., Yokohama-shi, Kanagawa (JP)

(72) Inventors: Ryuhei Hoya, Kawasaki (JP); Yuji Umezu, Yokohama (JP); Yusuke Ogata, Chiba (JP)

(73) Assignee: Socionext, Inc., Yokohama (JP)

(*) Notice: Subject to any disclaimer, the term of this patent is extended or adjusted under 35 U.S.C. 154(b) by 0 days.

(21) Appl. No.: 14/799,268

(22) Filed: Jul. 14, 2015

(65) Prior Publication Data

US 2016/0026893 A1  Jan. 28, 2016

(30) Foreign Application Priority Data

Jul. 25, 2014  (JP) .................................. 2014-151661

(51) Int. Cl.
| | |
|---|---|
| *G06K 9/40* | (2006.01) |
| *G06K 9/46* | (2006.01) |
| *G06T 7/40* | (2006.01) |
| *G06K 9/00* | (2006.01) |

(52) U.S. Cl.
CPC ............ *G06K 9/4652* (2013.01); *G06K 9/4661* (2013.01); *G06T 7/408* (2013.01); *G06K 9/00791* (2013.01); *G06T 2207/10024* (2013.01)

(58) Field of Classification Search
None
See application file for complete search history.

(56) References Cited

U.S. PATENT DOCUMENTS

| | | | |
|---|---|---|---|
| 2006/0115177 A1 | 6/2006 | Ishiga | |
| 2010/0040300 A1* | 2/2010 | Kang | G06K 9/00664 382/255 |
| 2010/0067823 A1* | 3/2010 | Kopf | G06K 9/00624 382/274 |
| 2010/0092103 A1 | 4/2010 | Ishiga | |
| 2012/0013772 A1 | 1/2012 | Ishiga | |
| 2013/0071043 A1 | 3/2013 | Bai | |

FOREIGN PATENT DOCUMENTS

| | | |
|---|---|---|
| JP | 2004-222231 A | 8/2004 |
| JP | 2011-3048 A | 1/2011 |
| JP | 2012-221237 A | 11/2012 |
| JP | 2013-58202 A | 3/2013 |

OTHER PUBLICATIONS

Zhai et al.; "An improved fog-degraded image enhancement algorithm"; Nov. 2-4, 2007; Proceedings of the 2007 international conference on wavelet analysis and pattern recognition; pp. 522-526.*

* cited by examiner

*Primary Examiner* — Eueng-Nan Yeh
(74) *Attorney, Agent, or Firm* — Arent Fox LLP

(57) ABSTRACT

A haze image discriminating apparatus has a first calculator to calculate a difference between a color difference component of an image signal of each of a plurality of pixels in an image and a gray value, and calculate a first ratio of pixels in which the difference is lower than a first reference value, to the plurality of pixels, a second calculator to calculate a second ratio of pixels in which a luminance component of the pixel signal of each of the plurality of pixels is lower than a second reference value, to the plurality of pixels, and a haze-degree determining unit to determine that a degree of haze of the image is higher as the first ratio is higher and the second ratio is lower.

13 Claims, 21 Drawing Sheets

FIG.2
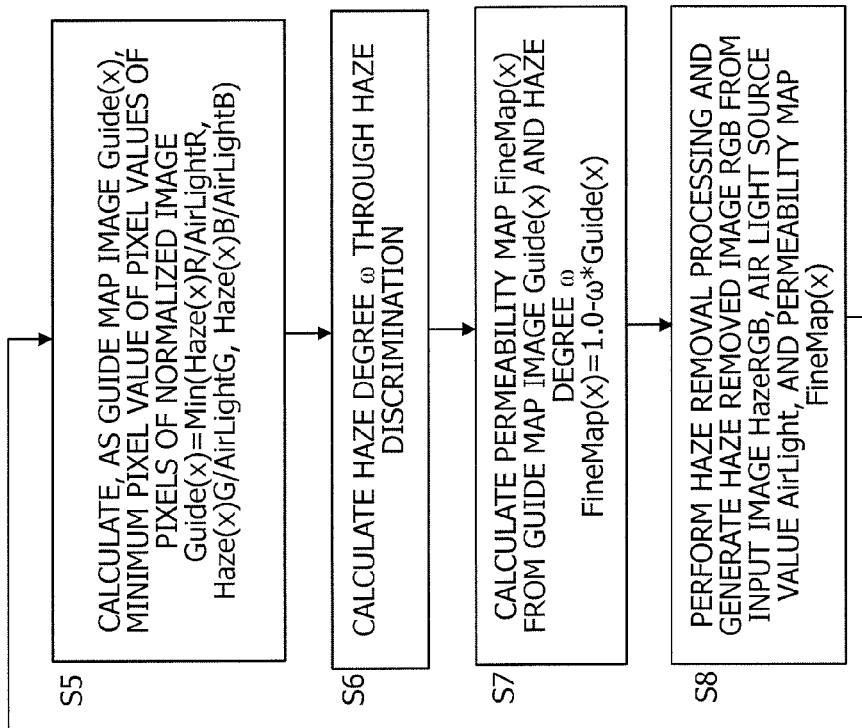
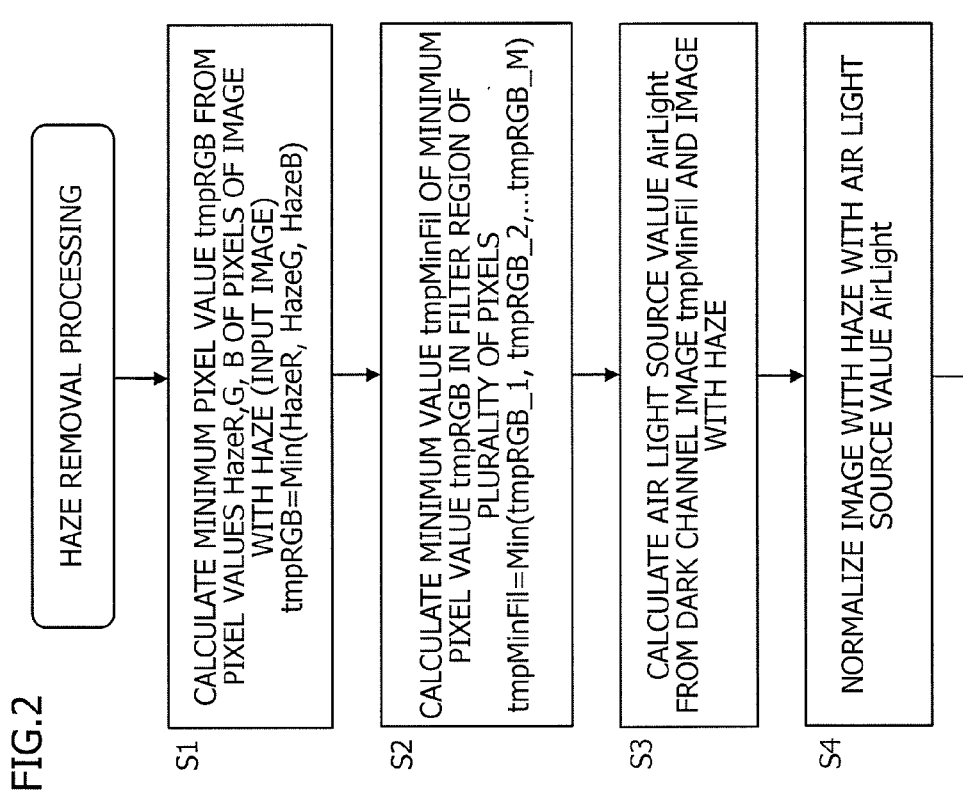

FIG.3A

| PX00<br>HazeR<br>HazeG<br>HazeB | PX01<br>HazeR<br>HazeG<br>HazeB | ... | PX0N<br>HazeR<br>HazeG<br>HazeB |
|---|---|---|---|
| PX10<br>HazeR<br>HazeG<br>HazeB | PX11<br>HazeR<br>HazeG<br>HazeB | ... | PX1N<br>HazeR<br>HazeG<br>HazeB |

FIG.3B

| PX00<br>tmpRGB=<br>Min(HazeR,HazeG,HazeB) | PX01<br>tmpRGB=<br>Min(HazeR,HazeG,HazeB) | ... | PX0N<br>tmpRGB=<br>Min(HazeR,HazeG,HazeB) |
|---|---|---|---|
| PX10<br>tmpRGB=<br>Min(HazeR,HazeG,HazeB) | PX11<br>tmpRGB=<br>Min(HazeR,HazeG,HazeB) | ... | PX1N<br>tmpRGB=<br>Min(HazeR,HazeG,HazeB) |

FIG.3C

| PX00<br>tmpMinFil=Min(tmpRGB_1,<br>tmpRGB_2,...tmpRGB_M) | PX01<br>tmpMinFil=Min(tmpRGB_1,<br>tmpRGB_2,...tmpRGB_M) | ... | PX0N<br>tmpMinFil=Min(tmpRGB_1,<br>tmpRGB_2,...tmpRGB_M) |
|---|---|---|---|
| PX10<br>tmpMinFil=Min(tmpRGB_1,<br>tmpRGB_2,...tmpRGB_M) | PX11<br>tmpMinFil=Min(tmpRGB_1,<br>tmpRGB_2,...tmpRGB_M) | ... | PX1N<br>tmpMinFil=Min(tmpRGB_1,<br>tmpRGB_2,...tmpRGB_M) |

FIG.5
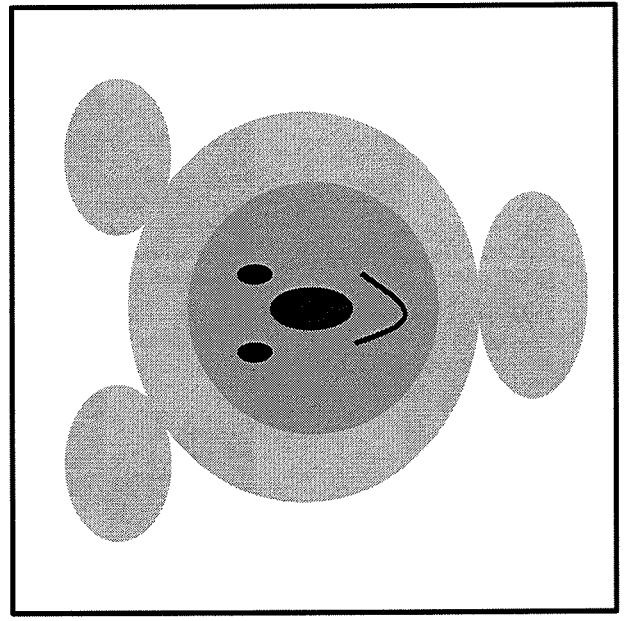
HAZE REMOVED IMAGES
ω=115/128
P12
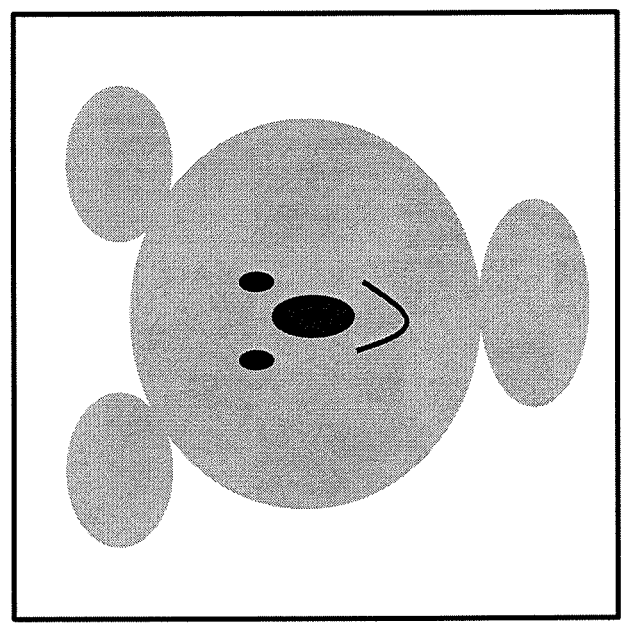
INPUT IMAGE
P11

FIG.7

| | | PR-1 | PR-2 | PR-3 | PR-4 | PR-5 |
|---|---|---|---|---|---|---|
| P1-1<br>HAZE IN ENTIRE IMAGE<br>ω = High | (image) | IMAGE WITH HAZE IN ENTIRE IMAGE. SINCE ENTIRE IMAGE IS GRAY PIXELS, DETERMINE THAT HAZE IS PRESENT IN ENTIRE IMAGE | SINCE ENTIRE IMAGE IS HAZY AND DARK PIXELS ARE FEW, DETERMINE THAT HAZE IS PRESENT IN ENTIRE IMAGE | SINCE AirLight VALUE IS GRAY AND ENTIRE IMAGE IS GRAY PIXELS, IMAGE IS CLOSE TO AirLight VALUE, AND DETERMINE THAT HAZE IS PRESENT IN ENTIRE IMAGE | SINCE EDGES ARE VERY FEW, DETERMINE THAT HAZE IS PRESENT IN ENTIRE IMAGE | AS IN PR-3, SINCE ENTIRE IMAGE IS GRAY IMAGE IS CLOSE TO LUMINANCE OF AirLight VALUE, SO DETERMINE THAT HAZE IS PRESENT IN ENTIRE IMAGE |
| P1-2<br>HAZE IN PART OF IMAGE<br>ω = Low | (image) | ALTHOUGH HAZE IS NOT PRESENT IN ENTIRE IMAGE, SINCE RATIO OF HAZE IS HIGH AND THERE ARE RELATIVELY LARGE NUMBER OF GRAY PIXELS, DETERMINE THAT HAZE IS PRESENT IN PART | SINCE RATIO OF HAZE IS HIGH AND DARK PIXELS ARE PRESENT ONLY IN FRONT IMAGE, DETERMINE THAT HAZE IS PRESENT IN PART OF IMAGE | SINCE PORTION OF HAZE IS CLOSE TO AirLight VALUE, DETERMINE THAT HAZE IS PRESENT IN PART OF IMAGE | SINCE EDGES ARE FEW IN PORTION OF HAZE, DETERMINE THAT HAZE IS PRESENT IN PART OF IMAGE | AS IN PR-3, PORTION OF HAZE IS LARGE, LUMINANCE OF IMAGE IS CLOSE TO AirLight VALUE, AND LARGE SKY IS ABSENT, SO DETERMINE THAT HAZE IS PRESENT IN PART OF IMAGE |

FIG.8

| | PR-1 | PR-2 | PR-3 | PR-4 | PR-5 |
|---|---|---|---|---|---|
| P1-3 WITHOUT HAZE ω=0 | IMAGE WITHOUT HAZE BUT, SINCE THERE ARE LARGE NUMBER OF GRAY PIXELS, DETERMINE THAT HAZE IS PRESENT IN PART OF IMAGE | ALTHOUGH THERE ARE LARGE NUMBER OF GRAY PIXELS, RATIO OF DARK PIXELS IS HIGH, THEREFORE DETERMINE THAT HAZE IS ABSENT | AirLight VALUE IS BRIGHT COLOR AND DIFFERENT FROM GRAY OF IMAGE, THEREFORE DETERMINE THAT HAZE IS ABSENT | SINCE THERE ARE LARGE NUMBER OF EDGES, DETERMINE THAT HAZE IS ABSENT | AS IN PR-3, SINCE DIFFERENT FROM AirLight VALUE, DETERMINE THAT HAZE IS ABSENT |

| | PR-1 | PR-2 | PR-3 | PR-4 | PR-5 |
|---|---|---|---|---|---|
| P1-4 WITHOUT HAZE ω=0 | IMAGE WITHOUT HAZE, BUT SINCE GRAY ROAD IS PRESENT IN ENTIRE IMAGE, DETERMINE THAT HAZE IS PRESENT IN PART OF IMAGE | SINCE RATIO OF DARK PIXELS IS LOW, DETERMINE THAT HAZE IS PRESENT IN PART OF IMAGE | SINCE AirLight VALUE IS WHITE OF BUS, ROAD IN MOST OF IMAGE IS GRAY AND CLOSE TO AirLight VALUE, SO DETERMINE THAT HAZE IS PRESENT IN PART OF IMAGE | SINCE THERE ARE LARGE NUMBER OF EDGES, DETERMINE THAT HAZE IS ABSENT | |
| P1-5 WITHOUT HAZE ω=0 | | | | | SINCE BRIGHT SKY IS ABSENT, AS IN PR-3, DETERMINE THAT HAZE IS PRESENT IN PART OF IMAGE |

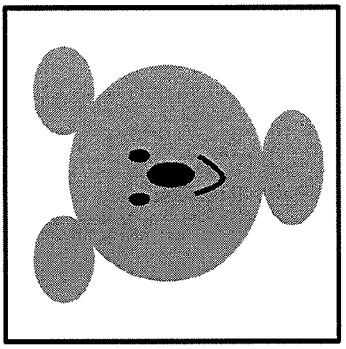
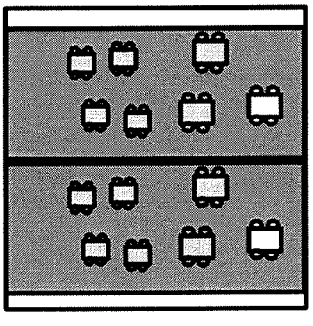
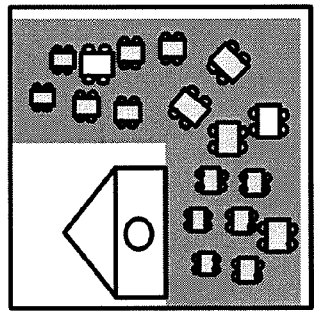

FIG.9

| | | PR-1 | PR-2 | PR-3 | PR-4 | PR-5 |
|---|---|---|---|---|---|---|
| P1-6 HAZE IN ENTIRE IMAGE ω = High | *image* | IMAGE WITH HAZE, BUT HAZE IS NOT GRAY HAZE, SO DETERMINE THAT HAZE IS PRESENT IN PART OF IMAGE | SINCE HAZE IS PRESENT IN ENTIRE IMAGE, AND DARK PIXELS ARE FEW, SO DETERMINE THAT HAZE IS PRESENT IN PART OF IMAGE | AirLight VALUE IS THIN BLUE AND CLOSE TO DARK BLUE OF PIXELS, SO DETERMINE THAT HAZE IS PRESENT IN ENTIRE IMAGE | HAZE IS PRESENT IN ENTIRE IMAGE, AND EDGES ARE FEW, SO DETERMINE THAT HAZE IS PRESENT IN ENTIRE IMAGE | AS IN PR-3, SINCE BRIGHT SKY IS ABSENT, DETERMINE THAT HAZE IS PRESENT IN ENTIRE IMAGE |
| P1-7 WITHOUT HAZE ω = 0 | *image* | IMAGE WITHOUT HAZE, BUT GRAY ROAD OCCUPIES LARGE REGION, SO DETERMINE THAT HAZE IS PRESENT IN ENTIRE IMAGE | SINCE DARK PIXELS ARE FEW, DETERMINE THAT HAZE IS PRESENT IN ENTIRE IMAGE | AirLight VALUE IS WHITE, ROAD IN MOST OF IMAGE IS GRAY, SKY IS LIGHT BLUE AND CLOSE TO AirLight VALUE, SO DETERMINE THAT HAZE IS PRESENT IN ENTIRE IMAGE | SINCE EDGES ARE FEW, DETERMINE THAT HAZE IS PRESENT IN ENTIRE IMAGE | SINCE LUMINANCE OF SKY IS HIGH AND LUMINANCE IS DIFFERENT FROM AirLight, DETERMINE THAT HAZE IS ABSENT |

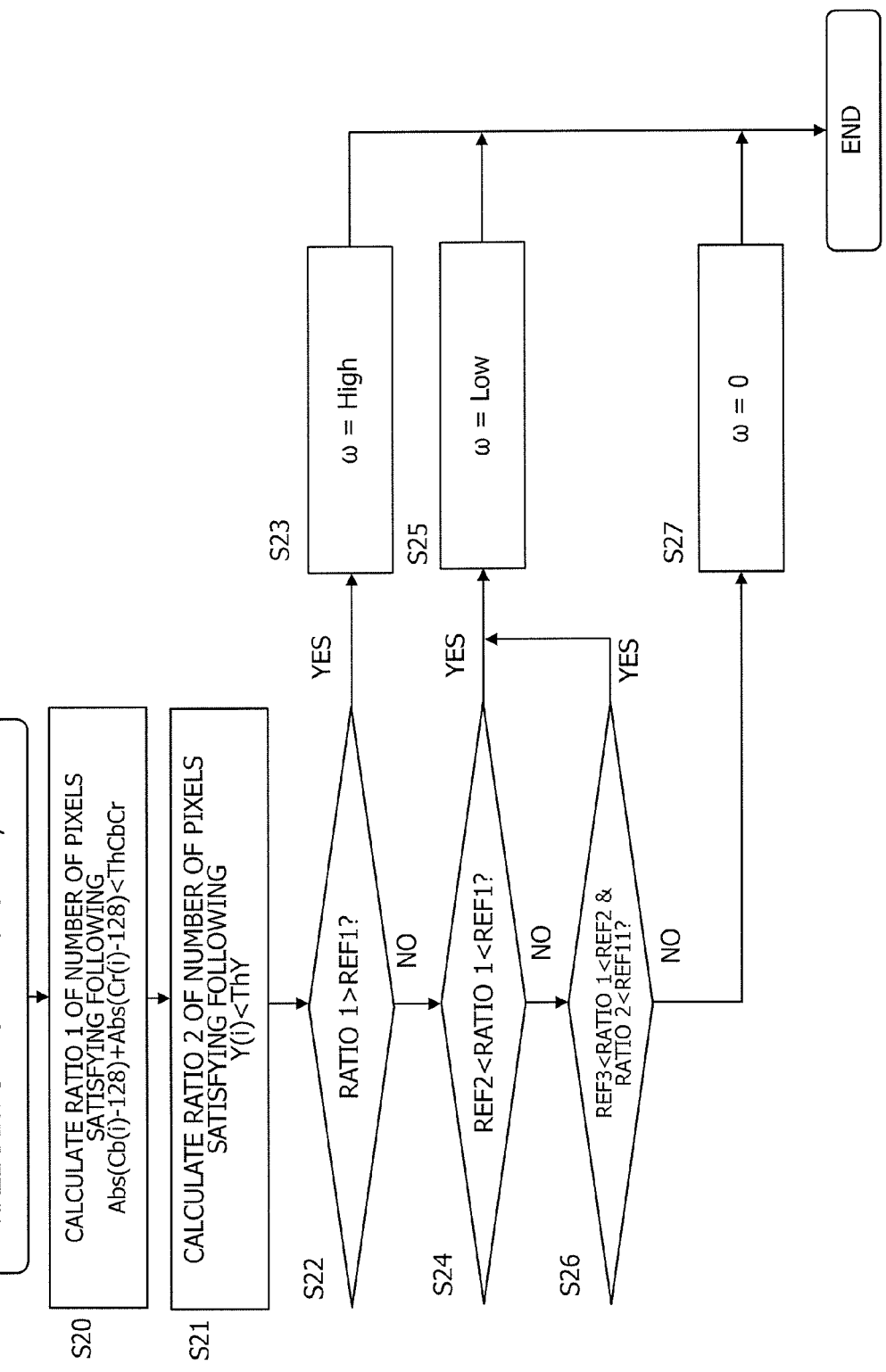

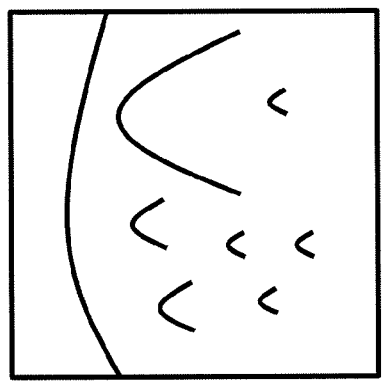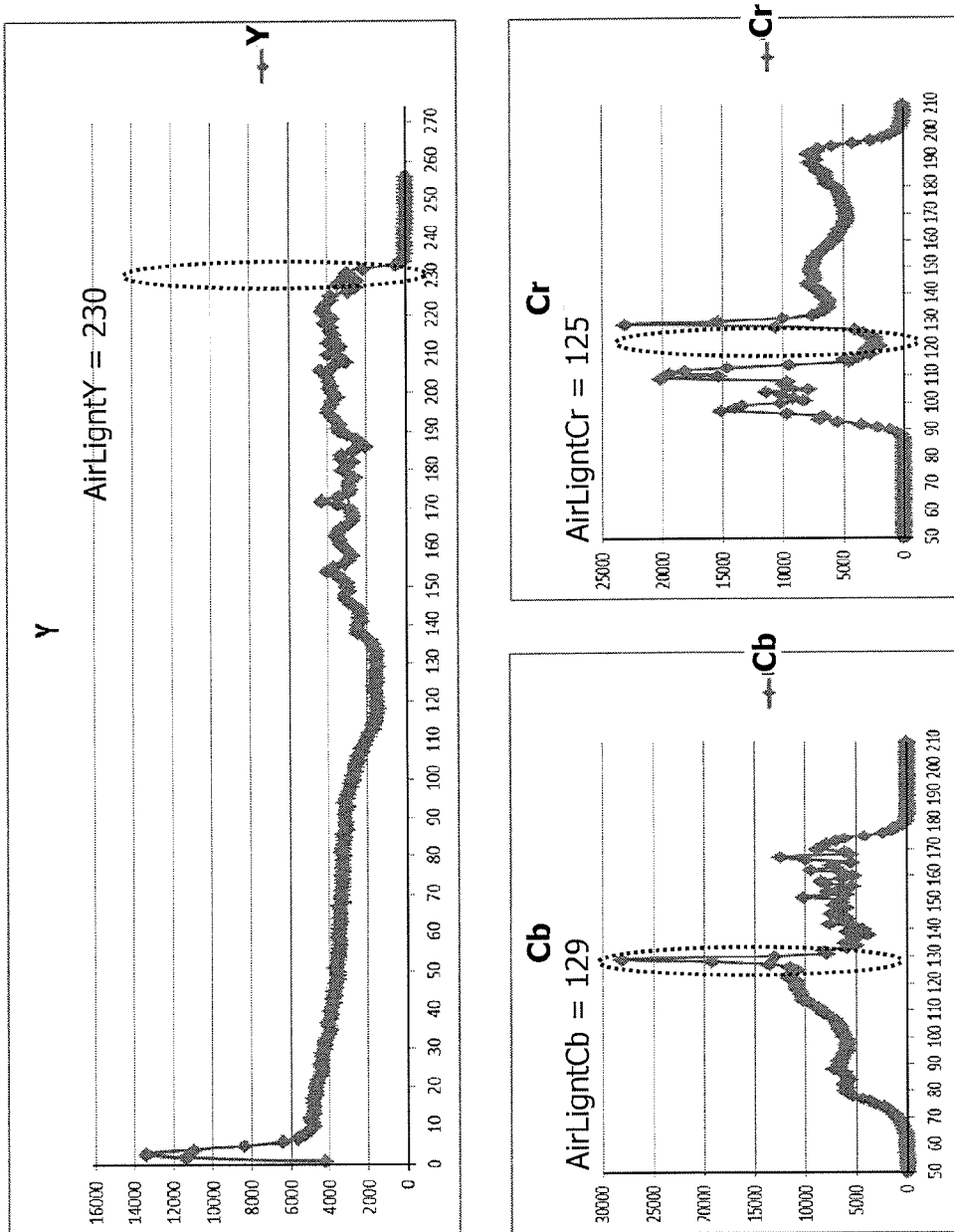
FIG.15

FIG.18
NewY(x)i = Abs(AirLightY - Y(x)i) + MaxMin(i)
NewY(x)i = Abs(AirLightY - Y(x)i) + MaxMin(i)
MaxMin
| 13 | 25 | 16 | 9 |
|---|---|---|---|
| 42 | 32 | 46 | 35 |
| 56 | 30 | 86 | 76 |
| 86 | 71 | 66 | 68 |
MaxMin
| 197 | 157 | 141 | 191 |
|---|---|---|---|
| 190 | 217 | 207 | 135 |
| 188 | 201 | 205 | 152 |
| 162 | 152 | 206 | 199 |
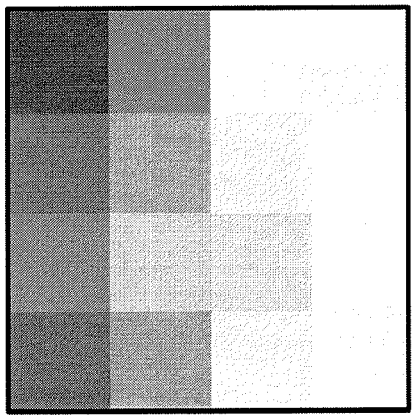
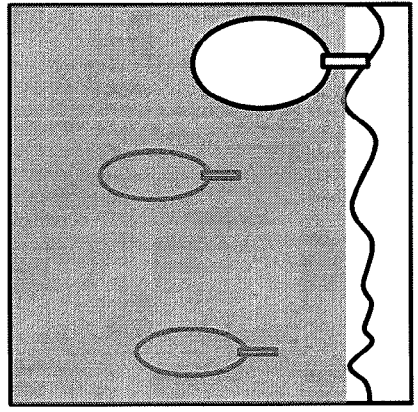
P2-1
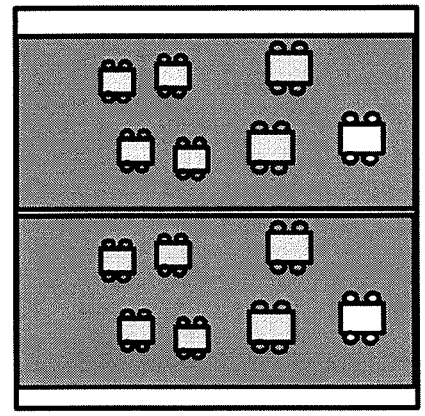
P1-4

FIG.20
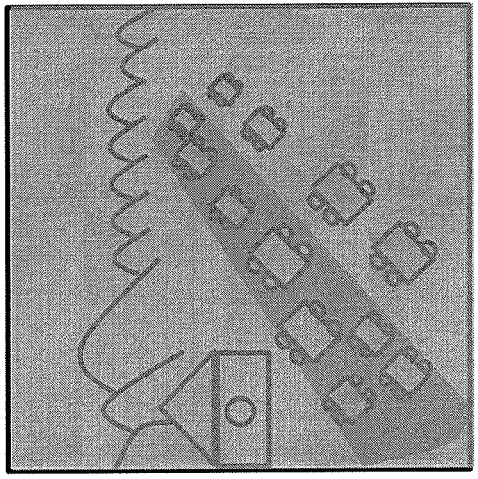
P1-7(3) (1-e^-kd = 0.8)
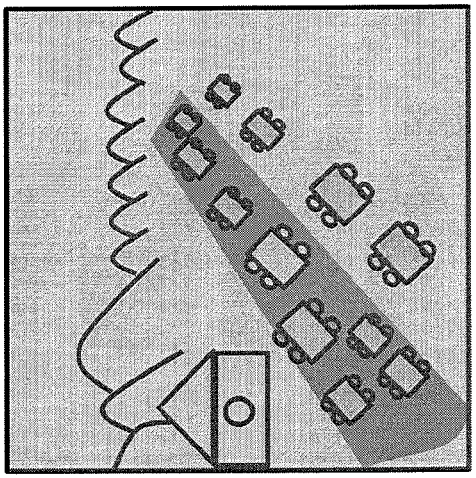
P1-7(2) (1-e^-kd = 0.5)
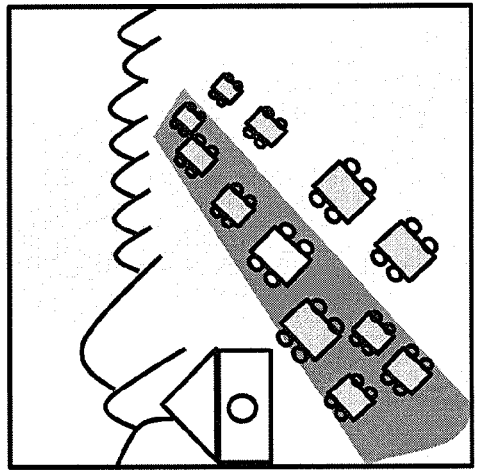
P1-7(1) (1-e^-kd = 0.3)
L(HAZE IMAGE)=L0(NO HAZE IMAGE)* e^-kd + Lf(AirLight)* (1-e^-kd)
WHERE, e^-kd=e^-kd: PERMEABILITY, BLEND RATE
(1-e^-kd): OPACITY
e^-kd=1 INDICATES THAT NO HAZE IS PRESENT,
e^-kd=0 INDICATES THAT HAZE IS PRESENT IN ENTIRE IMAGE

HAZE IMAGE DISCRIMINATING APPARATUS AND DISCRIMINATING METHOD

CROSS-REFERENCE TO RELATED APPLICATION

This application is based upon and claims the benefit of priority of the prior Japanese Patent Application No. 2014-151661, filed on Jul. 25, 2014, the entire contents of which are incorporated herein by reference.

FIELD

The present invention relates to a haze image discriminating apparatus and a haze image discriminating method.

BACKGROUND

A picked-up image by a camera is made unclear by floating objects in the air such as haze, fog, and mist. In the following explanation, haze represents haze, fog, mist, and the like.

Therefore, there has been proposed image processing for haze removal for removing the influence of haze from picked-up image data. The image processing is proposed in, for example, Japanese Patent Application Laid-open No. 2013-58202, Japanese Patent Application Laid-open No. 2012-221237, Japanese Patent Application Laid-open No. 2011-3048, and Japanese Patent Application Laid-open No. 2004-222231.

As one image processing for haze removal, there is processing based on prior information called dark channel prior. The processing is based on the premise that a picture in which an intensity value of at least one color channel of RGB values is very small (in general, a dark gradation value close to 0) is present in statistical values obtained from an outdoor image group without haze, that is, a large number of non-sky local regions of outdoor images without haze. Therefore, if a value of a dark color channel in a picked-up image is low, haze is thin and the permeability of the air is high. On the other hand, if the value of the dark color channel in the picked-up image is high, the haze is thick and the permeability of the air is low. With a haze removal model generated using the dark channel prior, it is possible to not only directly estimate the concentration of the haze but also generate a high-quality image (referred to as haze removed image) after the disturbance of the haze is removed from an image in which haze is present (hereinafter referred to as image with haze). The image processing for haze removal is described in Japanese Patent Application Laid-open No. 2013-58202.

SUMMARY

In the image processing for haze removal, a guide map value obtained by normalizing a pixel value of a dark color channel of a picked-up image with an air light source value is multiplied by a parameter indicating a degree of haze to calculate a transmission map, which is the permeability of the haze for each pixel. A haze removed image is calculated from an image with haze according to the transmission map.

However, as the parameter indicating the degree of the haze, an appropriate value has to be determined by viewing the haze removed image. Therefore, there is a demand for a haze image discriminating method for automatically discriminating the degree of the haze.

One aspect of the embodiment is a haze image discriminating apparatus comprising:
a first calculator configured to calculate a difference between a color difference component of an image signal of each of a plurality of pixels included in an image and a gray value, and calculates a first ratio of pixels in which the difference is lower than a first reference value, to the plurality of pixels;
a second calculator configured to calculate a second ratio of pixels in which a luminance component of the pixel signal of each of the plurality of pixels is lower than a second reference value, to the plurality of pixels; and
a haze-degree determining unit configured to determine that a degree of haze of the image is higher as the first ratio is higher and the second ratio is lower.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a flowchart of the haze removal processing.

FIGS. 3A to 3C are diagrams for explaining steps S1 and S2 explained above.

FIG. 5 is a diagram depicting another example of a certain input image and a haze removed image.

FIGS. 7, 8 and 9 are diagrams depicting relations among various input images to be subjected to haze image determination, expected haze degree parameters $\omega$ of the input images, and the haze degree parameters $\omega$ to be discriminated by five kinds of haze degree discrimination processing.

FIG. 10 is a flowchart according to a combination of the first haze image discrimination processing and the second haze image discrimination processing.

FIGS. 14 and 15 are diagrams depicting relation examples between the luminance Y and the color difference components Cb and Cr of an image including thick haze and an image without haze and luminance and color difference components of the air light.

FIGS. 17 and 18 are diagrams for explaining processing in the flow chart of FIG. 16.

FIG. 20 is a diagram depicting three images with haze in which the permeability of the image P1-7 is changed.

DESCRIPTION OF EMBODIMENTS

Figure 1:
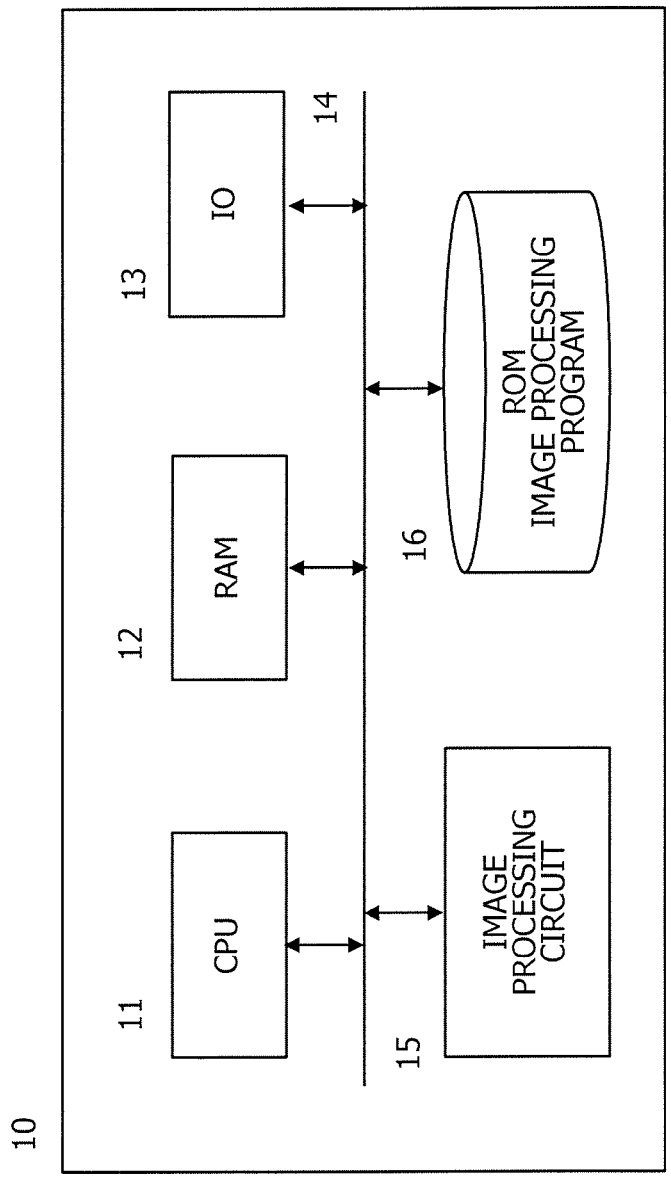
FIG. 1 is a diagram depicting the configuration of a haze image discriminating apparatus in an embodiment.

FIG. 1 is a diagram depicting the configuration of a haze image discriminating apparatus in an embodiment. A haze image discriminating apparatus 10 performs haze image discrimination processing for discriminating whether a degree of haze of an image is high or low. Further, the haze image discriminating apparatus 10 may perform, in addition to the haze image discrimination processing, haze removal processing for generating a haze removed image obtained by removing the influence of haze from an image with haze.

The haze image discriminating apparatus 10 includes a central processing unit (CPU) 11, a RAM 12, an input/output unit 13, an image processing circuit 15 that performs various kinds of image processing, and a memory 16 that stores an image processing program. The image processing circuit 15 includes, for example, a circuit that converts pixel signals of RGB into pixel signals of YCbCr having a luminance component Y and color difference components Cr and Cb, a circuit that determines whether a difference between a color difference component and a gray value of a pixel signal, a difference between the color difference component of the pixel image and a color difference component of air light, a difference between the luminance of the pixel signal and the luminance of the air light, and the like are smaller or larger than reference values of the respective differences, and a circuit that calculates an edge component of an image.

The CPU 11 executes the image processing program to perform haze image discrimination processing for discriminating a degree of haze. In the processing for discriminating a degree of haze, the CPU 11 causes the image processing circuit 15 to execute various arithmetic operations and determines a degree of haze using results of the arithmetic operations. In the haze image discriminating apparatus 10, for haze image discrimination, it is determined as appropriate which processing the image processing circuit 15 executes and which processing the CPU 11 and the image processing program execute.

Therefore, the haze image discriminating apparatus 10 includes calculator, which corresponds to the image processing circuit 15, for performing various kinds of calculation processing and discriminating unit, which corresponds to the CPU 11 that executes the image processing program, for discriminating a degree of haze on the basis of a value calculated by the calculating means.

FIG. 2 is a flowchart of the haze removal processing. The haze image discriminating apparatus 10 may perform the haze removal processing or another processor not depicted in the figure may perform the haze removal processing. An example of the haze removal processing is explained to explain how a parameter indicating a degree of haze is used. The haze removal processing depicted in FIG. 2 is processing performed based on the dark channel prior.

When a floating object such as haze is present in the air, in an image with haze, an image of an object is weakened according to the permeability of the haze. Colors of air light reflected by the floating object are blended according to the opacity of the haze. Therefore, the image with haze is represented by the following model:

$$I(x)=J(x)t(x)+\text{AirLight}(1-t(x)) \quad (1)$$

where, I(x) represents the image with haze, J(x) represents a haze removed image, t(x) represents the permeability of the haze, AirLight represents the air light source value, a sun light value or so (hereinafter "air light")(common in a fame), (1−t(x)) represents the opacity, and x represents a pixel. Expression (1) holds concerning each of pixel signals RGB. When the permeability t(x) is 1.0, the air light is not blended. Therefore, I(x)=J(x). The image with haze I(x) is the same as the haze removed image J(x). Therefore, I(x) is hereinafter referred to as input image as well.

As it is seen from Expression (1), the image with haze I(x) is obtained by blending the image without haze J(x) and the air light AirLight at the permeability t(x) of the haze. According to Expression (1), if the permeability t(x) and the air light AirLight is calculated, the haze removed image J(x) is calculated from the image with haze I(x), which is a picked-up input image.

Therefore, in the haze removal processing, a dark channel image, which is a degree of absence of haze, is calculated from a plurality of pixel signals of the image with haze I(x), which is the picked-up input image. And the permeability t(x) of the haze is calculated from the dark channel image.

In FIG. 2, in the haze removal processing, a minimum pixel value tmpRGB is calculated as described below from RGB pixel values HazeR, HazeG, and HazeB of the image signal I(x) of the image with haze (S1). Min( ) is a function for calculating a minimum value.

$$tmpRGB=\text{Min}(HazeR,HazeG,HazeB) \quad (2)$$

Further, in the haze removal processing, a minimum value tmpMinFil of the minimum pixel value tmpRGB in a filter region including a plurality of pixels is calculated as described below (S2). M is the number of pixels in the filter region.

$$tmpMinFil=\text{Min}(tmpRGB\_1,tmpRGB\_2,\ldots,tmpRGB\_M) \quad (3)$$

The filtered minimum pixel value tmpMinFil is a pixel value of the dark channel image. The pixel value of the dark channel image is a value obtained by filtering minimum values of RGB of the pixels. Therefore, the pixel value is an intensity value rather than a color component.

FIGS. 3A to 3C are diagrams for explaining steps S1 and S2 explained above. FIG. 3A depicts the pixels values (HazeR, HazeG, and HazeB) of pixels PX00 to PX1N in two rows and N columns. FIG. 3B depicts the minimum pixel value tmpRGB calculated by step S1. The pixels PX00 to PX1N respectively have minimum values tmpRGB of RGB values of the respective pixels. FIG. 3C depicts the filtered minimum pixel value tmpMinFil calculated by step S2. FIG. 3C corresponds to the dark channel image.

The dark channel image of Expression (3) correspond to the intensity of a dark image in the image with haze I(x), which is the input image not subjected to haze removal. A reason for calculating the dark channel image is based on a characteristic that a dark pixel is present in the image without haze and a dark image is absent in an image with thick haze. Therefore, in the input image without haze, a pixel value of the dark channel image is close to 0. In the input image with thick haze, the pixel value of the dark channel image increases. Therefore, in haze removal processing based on the dark channel image, the permeability t(x) of Expression (1) is calculated on the basis of the dark channel image.

Referring back to FIG. 2, in the haze removal processing, a value AirLight of the air light is calculated from the dark channel image tmpMinFil and the input image (the image with haze) I(x) (S3). There are various methods of calculating the air light AirLight. As an example, among a plurality of pixels having high intensity in a frame of the dark channel image tmpMinFil, the pixel values (HazeR, HazeG, and HazeB) of a pixel having maximum luminance of the input image I(x) corresponding to the plurality of pixels are set as the air light AirLight. That is, schematically, an image having high luminance in the frame is specified as an image of an air light source and a pixel value of the image is set as the air light AirLight.

Subsequently, in the haze removal processing, a pixel value of the image with haze, which is the input image, is normalized by the air light AirLight (S4). A minimum value of the normalized pixel values (HazeR/AirLightR, HazeG/AirLightG, and HazeB/AirLightB) is calculated by Expression (4) below as a guide map image Guide(x).

$$\text{Guide}(x) = \text{Min}(\text{Haze}R/\text{AirLight}R, \text{Haze}G/\text{AirLight}G, \text{Haze}B/\text{AirLight}B) \quad (4)$$

The guide map image Guide(x) calculated by Expression (4) is the same as an image obtained by normalizing the minimum value (the dark channel image not filtered) of the pixel values RGB calculated by Expression (2) with the air light AirLight. Since a maximum value of the dark image is equal to or smaller than the air light AirLight, the guide map image Guide(x) obtained by normalizing the dark channel image with the air light AirLight is a value within a range of 0 to 1.0.

Subsequently, in the haze removal processing, a degree ω of the haze is calculated according to haze discrimination in this embodiment (S6). Processing for calculating the haze degree parameter ω is explained in detail below. In the haze removal processing, a permeability map FineMap(x) is calculated by the following Expression (5) on the basis of this haze degree parameter ω (S7). The permeability map FineMap(x) is the same as the permeability t(x) of haze of Expression (1).

$$\text{FineMap}(x) = 1.0 - \omega^* \text{Guide}(x) \quad (5)$$

In Expression (5), a reason for multiplying the guide map image Guide(x) by the haze degree parameter ω is as explained below. Although the dark channel image is one index of thickness of haze, the dark channel image does not directly represent the thickness of haze. The haze degree parameter ω is a value of 0 to 1.0. When the haze degree is high, ω is close to 1.0. When the haze degree is low, ω is close to 0. When haze is absent, ω is zero. As a result of the multiplication, by the haze degree parameter ω, of the guide map image Guide(x) obtained by normalizing the dark channel image with the air light, the permeability map FineMap(x) has a relation with the guide map image Guide (x) obtained by normalizing the dark channel image with the air light and the haze degree parameter ω as explained below.

When the haze is thick, the dark channel image is bright (intensity is high) and is close to the air light AirLight, the guide map image Guide(x) is close to 1.0, and the permeability FineMap(x) is close to 0. In this case, when it is determined that the degree ω of the haze is high, the guide map image Guide(x) is highlighted and the permeability FineMap(x) is closer to 0.

On the other hand, when the haze is thin, the dark channel image is dark (intensity is low) and is different from the air light AirLight, the guide map image Guide(x) is close to 0, and the permeability FineMap(x) is close to 1.0. In this case, when it is determined that the degree ω of the haze is low, the guide map image Guide(x) is weakened and the permeability FineMap(x) is closer to 1.0.

According to Expression (1), when the permeability map FineMap(x) is 0, the haze is thick and the image with haze I(x), which is the input image, has a single color of only the air light AirLight. When the permeability map FineMap(x) is 1.0, the haze is absent and the image with haze I(x), which is the input image, is equal to the haze removed image J(x).

When the permeability map FineMap(x) and the air light AirLight are calculated, in the haze removal processing, the pixel signals RGB of the haze removed image J(x) are calculated on the basis of Expression (1) (S8). That is, the pixel signals RGB are calculated as indicated by Expression (6) below.

$$J(x) = \{I(x) - \text{AirLight}\}/\text{FineMap}(x) + \text{AirLight} \quad (6)$$

Figure 4:
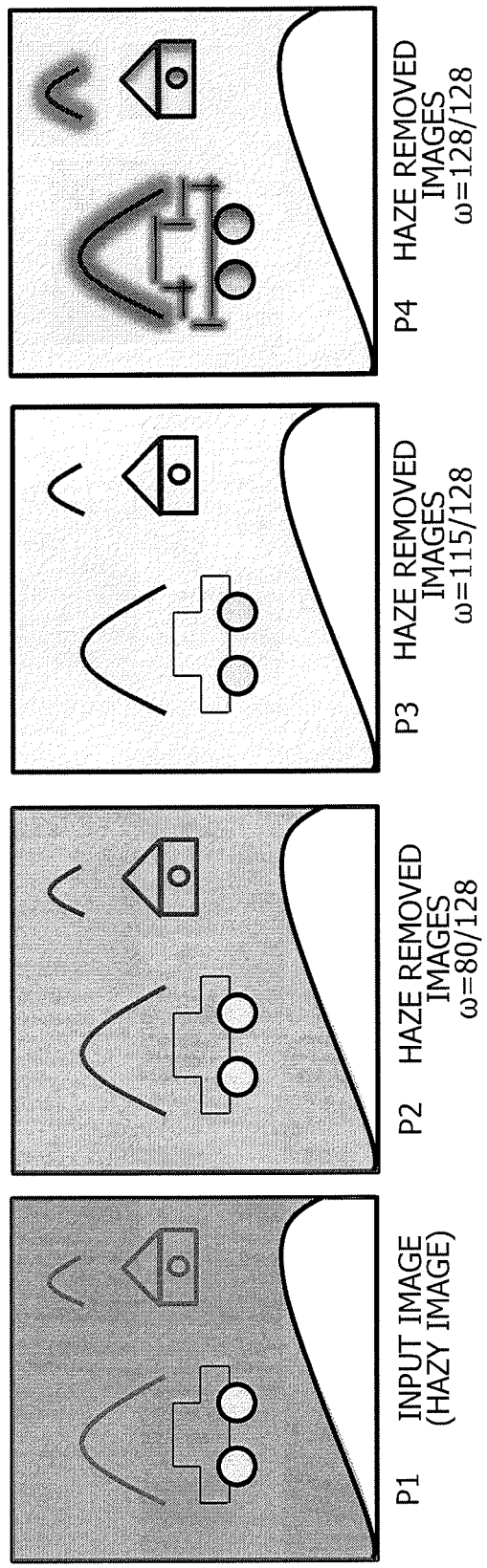
FIG. 4 is a diagram depicting an example of a certain input image and a haze removed image.

FIG. 4 is a diagram depicting an example of a certain input image and a haze removed image. An input image P1 is a hazy image including images of mountains and a house. The guide map image Guide(x) is calculated by the haze removal processing. Three kinds of haze degree parameters ω are selected to calculate the permeability map FineMap (x). Three haze removed images P2, P3, and P4 calculated by Expression (6) are depicted in FIG. 4. The haze removed image P2 subjected to the haze removal processing has the haze degree parameter ω=80/128. The haze is not completely removed yet. The haze removed image P3 has the haze degree parameter ω=115/128. The haze is considerably removed. On the other hand, the haze removed image P4 has the maximum haze degree parameter ω=128/128. Instead, a tint of the image is unnatural.

If the haze degree parameter ω can be set to an optimum value as explained above, it is possible to generate a more natural haze removed image.

FIG. 5 is a diagram depicting another example of a certain input image and a haze removed image. An input image P11 is an image in which a koala bear having gray hair is not hazy or haze is very thin. A haze removed image P12 subjected to the haze removal processing is an image subjected to the haze removal processing with the haze degree parameter ω=115/128. In this case, in the input image P11, an image of the koala bear entirely colored in gray is determined as having a haze color as a whole. Therefore, a dark channel image is bright. When the haze degree parameter ω is set rather large, the haze removed image P12 changes to an image in which the hair of the koala bear is reddish. A tint of the image is unnatural.

As it is seen in the examples depicted in FIG. 4 and FIG. 5, if a degree of haze of an input image can be highly accurately discriminated, it is possible to calculate more natural haze removed image. Even in an input image having a gray color easily misunderstood as haze, if a degree of haze can be highly accurately discriminated, it is possible to suppress the influence of the dark channel image and suppress generation of an unnatural haze removed image.

[Haze Image Discrimination Processing in this Embodiment]

Figure 6:
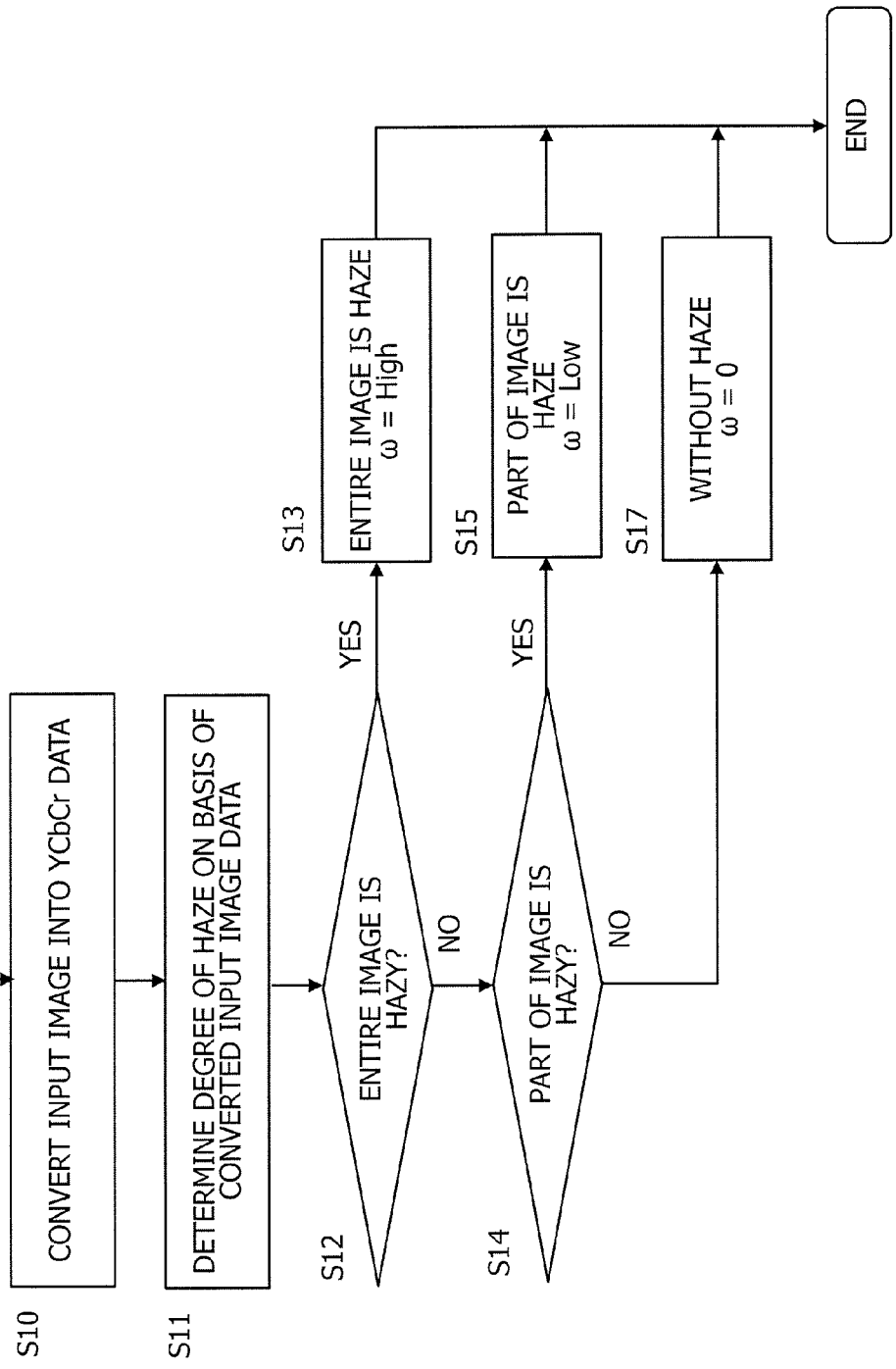
FIG. 6 is a flowchart of haze image discrimination processing in this embodiment.

FIG. 6 is a flowchart of haze image discrimination processing in this embodiment. The haze image discrimination processing is the processing in step S6 for calculating the haze degree ω through the haze determination depicted in FIG. 2. In the haze image discrimination processing, an input image is converted into an image signal including a luminance component Y and color difference components Cr and Cb (S10). When the input image is pixel signals of RGB, the image signals are converted into image signals of YCrCb by a known conversion formula. When the input image is image signals of YCrCb, the image signals do not need to be converted.

The degree ω of the haze is determined on the basis of the converted input image data YCrCb (S11). According to the determination, when the entire image is hazy (YES in S12), the haze degree parameter ω is discriminated as High (the entire image is the haze) (S13). When a part of the image is hazy (YES in S14), the haze degree parameter ω is discriminated as Low (a part of the image is the haze) (S15). Otherwise, the haze degree parameter ω is discriminated as 0 (the haze is absent) (S17).

FIGS. 7, 8, and 9 are diagrams depicting relations among various input images P1-1, P1-2, P1-3, P1-4, P1-5, P1-6, and P1-7 to be subjected to haze image determination, expected haze degree parameters ω of the respective input images, and the haze degree parameters ω to be discriminated by five kinds of haze degree discrimination processing explained below. According to haze image discrimination processing, the haze degree parameter ω is discriminated as High indicating that a haze degree is high, discriminated as Low indicating that the haze degree is low, or discriminated as 0 indicating that haze is absent.

The input image P1-1 is a typical hazy image including a car and a mountain and is occupied by gray pixels as a whole. Therefore, expected ω is High. The input image P1-2 includes a mountain scene. The input image P1-2 is also a typical hazy image. However, haze is absent in a lower portion of the image. Therefore, the expected ω is Low.

The input image P1-3 is an image of a koala bear same as P11 depicted in FIG. 5 and is an image in which there are a lot of gray pixels of the koala. However, since haze is absent, the expected ω is 0. The input images P1-4 and P1-5 are images in which cars having bright colors are present in an asphalt road. However, since haze is absent, the expected ω is 0.

The input image P1-6 is an image entirely hazing in blue including a car and a building. The expected ω is High. The input image P1-7 is an image including a road, cars, mountains, and a house. The bright sky occupies a large portion. However, since haze is absent, the expected ω is 0.

In FIGS. 7, 8, and 9, discrimination results by the haze image discrimination processing explained below are briefly described for the respective input images.

[First Haze Image Discrimination Processing PR-1 and Second Haze Image Discrimination Processing PR-2]

In the first haze image discrimination processing PR-1, a ratio of pixels close to gray, which is a typical color of haze, to pixels of an input image is calculated. In the second haze image discrimination processing PR-2, a ratio of dark pixels in the input image is calculated. If the ratio of the pixels close to gray is high and the ratio of the dark pixels is low, it is determined that the degree ω of haze is high.

FIG. 10 is a flowchart according to a combination of the first haze image discrimination processing and the second haze image discrimination processing. In the first haze image discrimination processing PR-1, a first ratio (a ratio 1) of pixels in which differences between color difference components Cb(i) and Cr(i) of the pixel signals of the pixels and a gray value "128" are lower than a first reference value ThCrCb, to a plurality of pixels included in the input image I(x) is calculated (S20). That is, the first ratio is a value obtained by dividing the number of pixels satisfying the following expression (7) by a total number of pixels.

$$Abs(Cb(i)-128)+Abs(Cr(i)-128)<ThCbCr \quad (7)$$

where, i is a pixel and Abs means absolute value.

The color difference components Cb and Cr are degrees of difference from the gray value "128". When the color difference components of the pixels and the grapy value are small, this means that a color of the pixels is close to gray. Therefore, since pixels are close to gray in a typical haze image like the image P1-1, this means that the region of the haze in the image is wider as the first ratio is higher.

However, in the case of images including a large number of gray pixels like the images P1-3, P1-4, P1-5, and P1-7, according to the first haze image discrimination processing PR-1, it is determined that the region of the haze is wide.

Further, in the second haze image discrimination processing PR-2, a second ratio (a ratio 2) of pixels in which a luminance component Y(i) of the pixel signals of the pixels is lower than a second reference value ThY, to the plurality of pixels included in the input image I(x) is calculated (S21). That is, the second ratio is a value obtained by dividing the number of pixels satisfying a color described below (8) by a total number of pixels.

$$Y(i)<ThY \quad (8)$$

An image without haze has a characteristic that dark pixels are always included in the image. The dark channel image explained above is generated on the basis of the characteristic. This means that, in the second haze image discrimination processing PR-2, as the ratio of the number of pixels in which the luminance Y of the input image I(x) is lower than the second reference value ThY to the number of all pixels, that is, the second ratio is lower, the region of the haze is wider.

Figure 11:
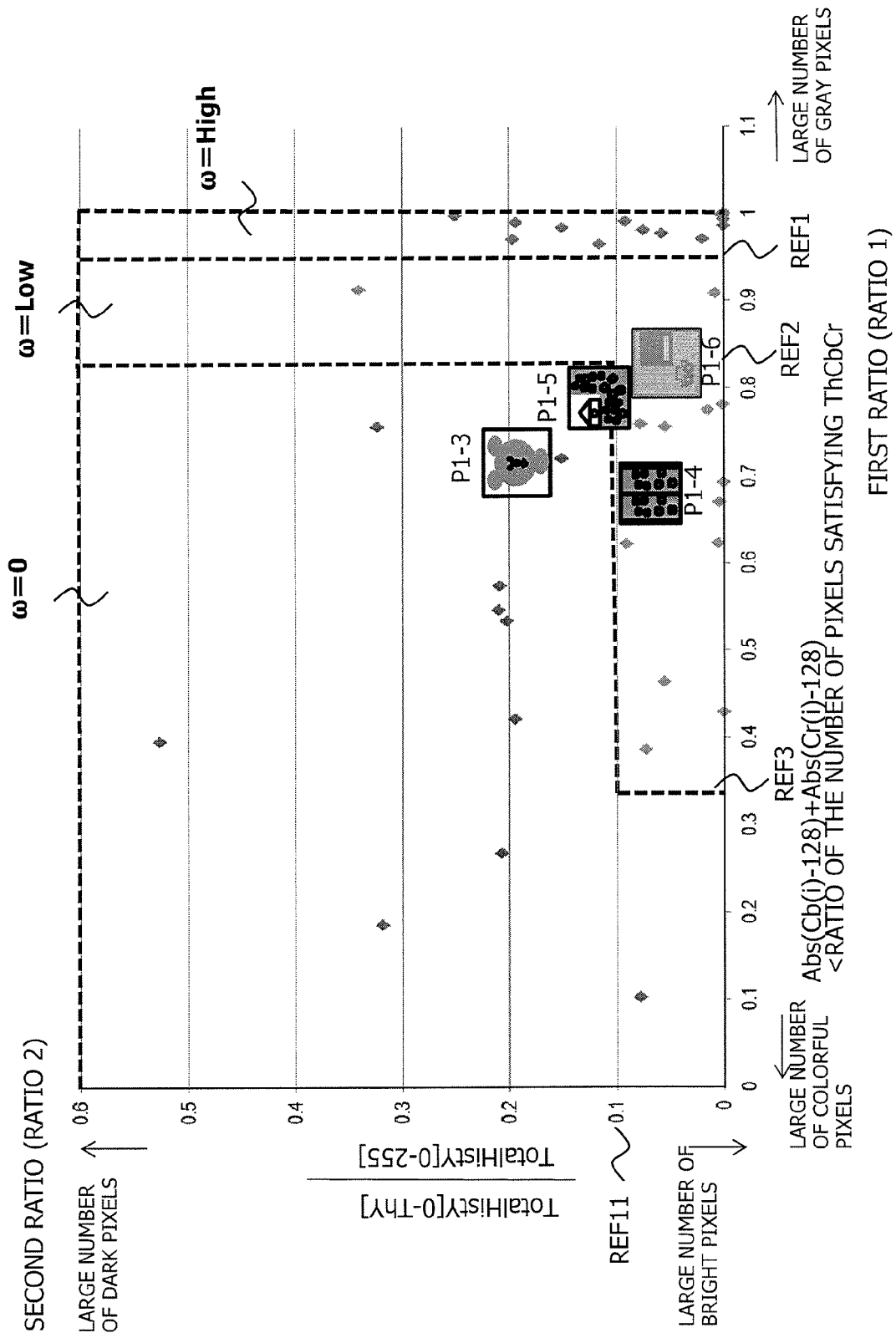
FIG. 11 is a diagram depicting matrices of the first and second ratios by the first haze discrimination processing and the second haze discrimination processing.

FIG. 11 is a diagram depicting matrixes of the first and second ratios by the first haze discrimination processing and the second haze discrimination processing. In FIG. 11, the abscissa indicates the first ratio of 0 to 1.0 by the first haze discrimination processing PR-1 and the ordinate indicates the second ratio of 0 to 1.0 by the second haze discrimination processing PR-2.

In this embodiment, the degree of the haze of the input image I(x) is discriminated using both of the first haze image discrimination processing PR-1 and the second haze image discrimination processing PR-2. That is, if the first ratio calculated in the first haze image discrimination processing PR-1 exceeds a reference value REF1 (the ratio 1>REF1), the degree ω of the haze is discriminated as High (YES in S22 and S23).

Further, when the first ratio is lower than the reference value REF1 and higher than a reference value REF2, the degree ω of the haze is discriminated as Low (YES in S24 and S25). When the first ratio is lower than the reference value REF2 and higher than the reference value REF3 and the second ratio is lower than a reference value REF11 (REF3<the ratio 1<REF2 and the ratio 2<REF11), the degree ω of the haze is discriminated as Low (YES in S26 and S25). Otherwise, the degree ω of the haze is discriminated as 0 (S27).

In FIG. 11, a region where the degree ω of the haze is High, a region where the degree ω of the haze is Low, and a region where the degree ω of the haze is 0 are depicted. In FIG. 11, the images P1-3, P1-4, P1-5, and P1-6 are also plotted. In the image P1-3, the degree ω of the haze is discriminated as 0. In the images P1-4, P1-5, and P1-6, the degree ω of the haze is discriminated as Low. In the image P1-3 of the koala bear, there are a large number of gray pixels and the first ratio is rather high. However, there are a relatively large number of dark pixels having the low luminance Y and the second ratio is rather high. Therefore, even if it is determined that the degree of the haze is high in the first haze discrimination processing PR-1, it is determined that the degree of the haze is low in the second haze discrimination processing PR-2. As a result, the degree ω of the haze is appropriately discriminated as 0 by the discrimination by the combination of the first haze discrimination processing and the second haze discrimination processing. In the images P1-4, P1-5, and P1-6, there are a relatively large number of gray pixels and there are a small number of dark pixels. Therefore, it is erroneously discriminated that the degree ω of the haze is Low.

[Third Haze Image Discrimination Processing PR-3]

Third haze image discrimination processing PR-3 is processing for appropriately discriminating the degree ω of the haze of an image, that is hazy as a whole but in which the air light AirLight is not gray like the image P1-6, as High. In the third haze image discrimination processing, a characteristic that, when the haze is thick, an input image is close to a color of the air light AirLight is used. That is, the air light AirLight is calculated from the input image. It is determined how close the color difference components CbCr of pixels of the input image are to the color difference component of the air light AirLight and how close the luminance component Y of the pixels of the input image are to the luminance component of the air light AirLight. It is determined that the degree of the haze is higher as the color difference components CbCr and the luminance component Y are closer to the color difference component and the luminance component of the air light AirLight.

Figure 12:
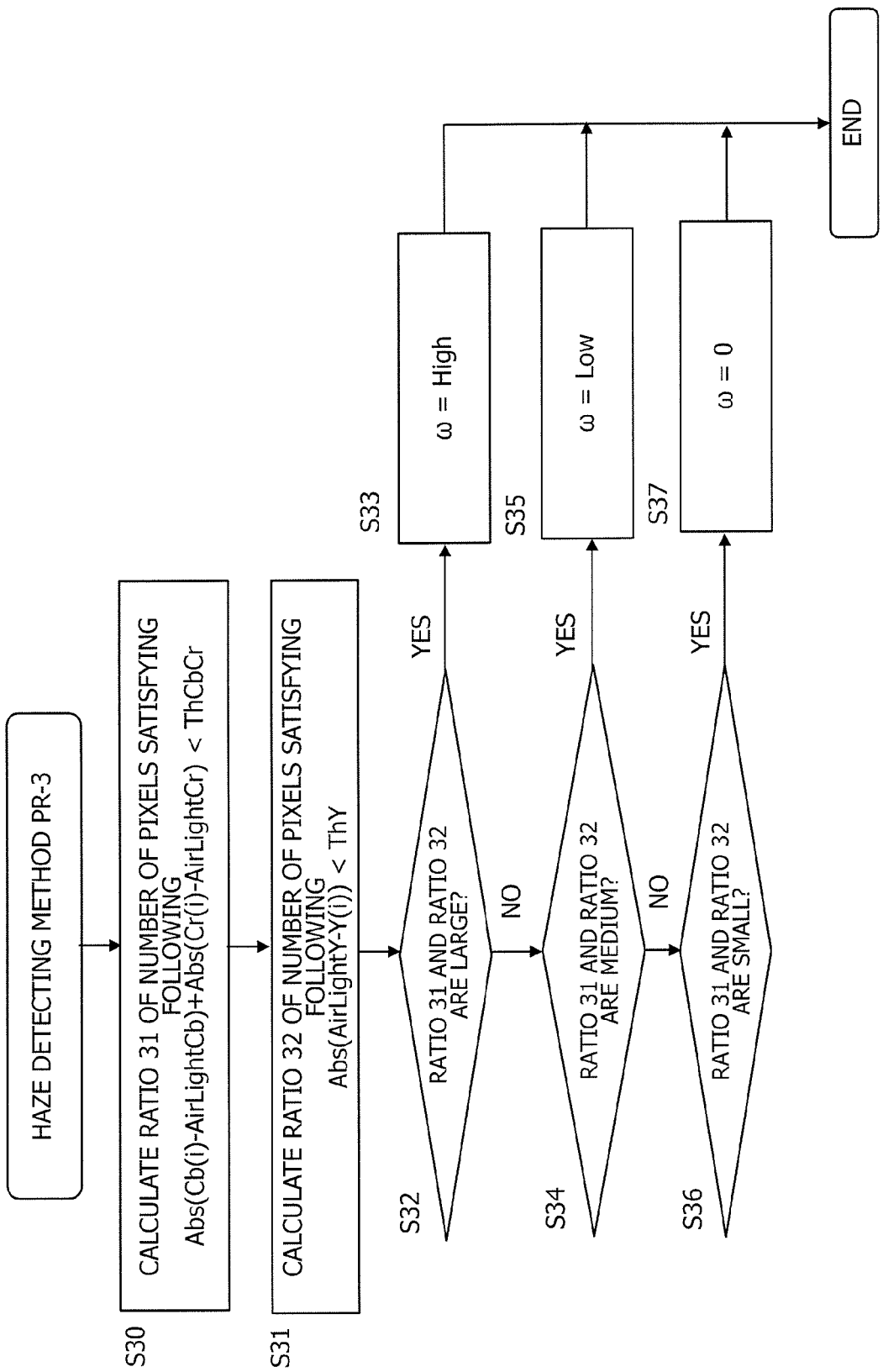
FIG. 12 is a flowchart for explaining the third haze image discrimination processing.

FIG. 12 is a flowchart for explaining the third haze image discrimination processing. In the third haze image discrimination processing PR-3, a third ratio (a ratio 31) of pixels in which respective differences between color difference components Cb(i) and Cr(i) of a pixel signal and color difference components AirLightCb and AirLightCr of the air light in an image are lower than a third reference value ThCbCr, to a plurality of pixels included in the image is calculated (S30). Specifically, the third ratio is a ratio of the number of pixels in which a sum of the two differences Abs(Cb(i)−AirLightCb)+Abs(Cr(i)−AirLightCr) is lower than the third reference value ThCbCr, to a total number of pixels. That is, a ratio (the ratio 31) of the number of pixels satisfying a condition described below, to the number of pixels of the entire image is calculated.

$$Abs(Cb(i)-AirLightCb)+Abs(Cr(i)-AirLightCr) < ThCbCr \quad (9)$$

Further, in the third haze image discrimination processing PR-3, a forth ratio (a ratio 32) of pixels in which respective a difference Abs(AirLightY−Y(i)) between the luminance component Y(i) of a pixel signal and the luminance component AirLight of the air light is lower than a fourth reference value ThY to a plurality of pixels included in the image is calculated (S31). Specifically, the fourth ratio is a ratio of the number of pixels satisfying a condition described below, to a total number of pixels.

$$Abs(AirLightY-Y(i)) < ThY \quad (10)$$

In the third haze image discrimination processing PR-3, it is determined that the degree ω of the haze of the image signal is higher as the third ratio (the ratio 31) is higher and the fourth ratio (the ratio 32) is higher (S32 to S37). That is, when both of the third ratio (the ratio 31) and the fourth ratio (the ratio 32) are large, the degree ω of the haze is discriminated as High (YES in S32 and S33). Further, in the third haze image discrimination processing PR-3, when both of the third ratio (the ratio 31) and the fourth ratio (the ratio 32) are a medium degree, the degree ω of the haze is discriminated as Low (YES in S34 and S35). In the third haze image discrimination processing PR-3, when both of the third ratio (the ratio 31) and the fourth ratio (the ration 32) are small, the degree ω of the haze is discriminated as 0 (YES in S36 and S37).

Figure 13:
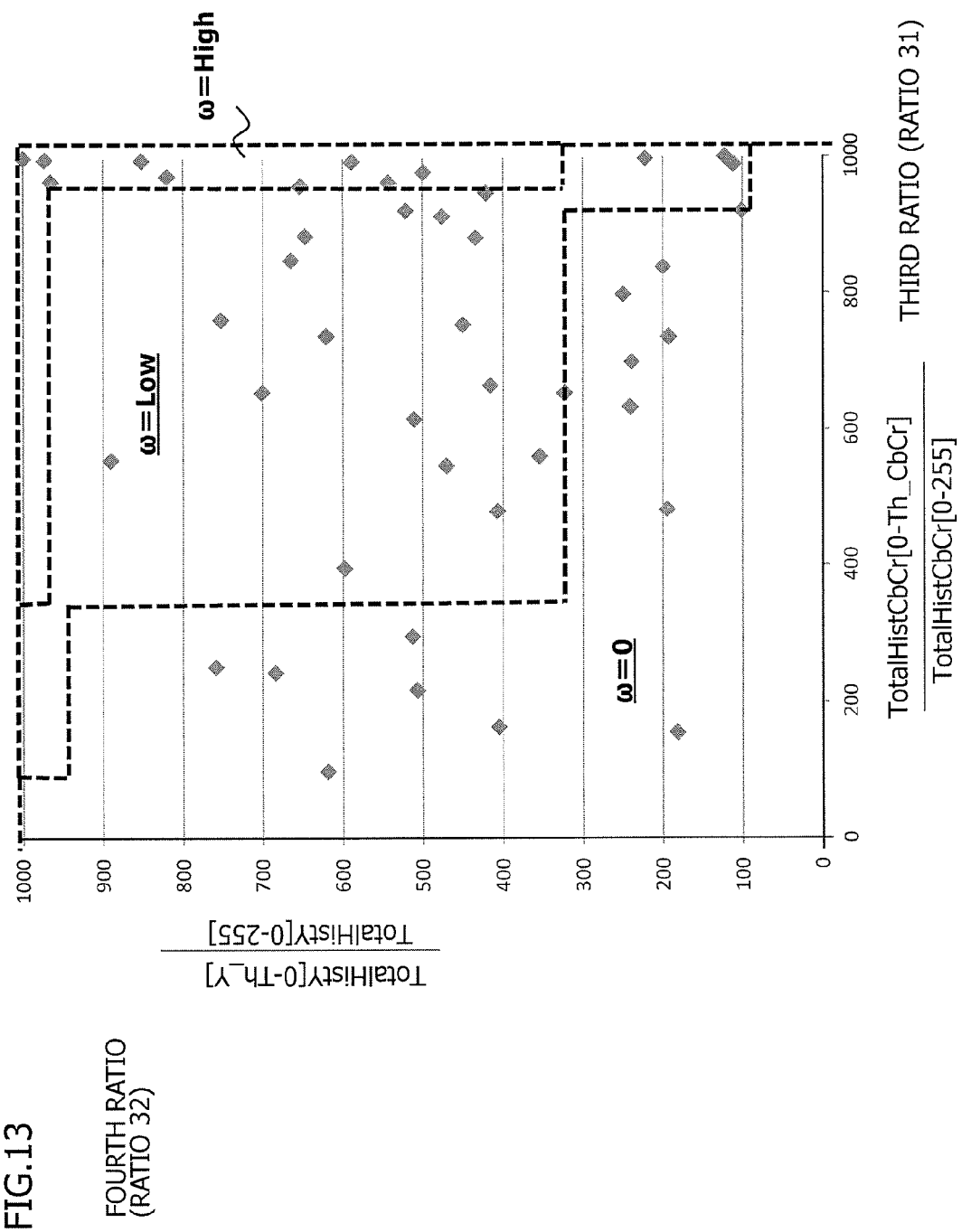
FIG. 13 is a diagram depicting matrices of the third and fourth ratios by the third haze image discrimination processing.

FIG. 13 is a diagram depicting matrixes of the third and fourth ratios by the third haze image discrimination processing. In FIG. 13, the abscissa indicates 0 to 10000 corresponding to the third ratio and the ordinate indicates 0 to 1000 corresponding to the second ratio by the second haze discrimination processing PR-2. In the figure, Total HistCbCr[0−Th_CbCr] represents the number of pixels (the number of histograms) in which a sum of differences between the color difference components Cb and Cr of pixels of an image and a color difference component of AirLight is smaller than the third reference value Th_CbCr. The same applies to the other notations.

In FIG. 13, the degree ω of the haze of an image in which the third ratio on the abscissa is high and the fourth ratio on the ordinate is high is discriminated as High, the degree ω of the haze of an image in which the third ratio is a medium degree and the fourth ratio is a medium degree is Low, and the degree ω of the haze of an image in which the third ratio is small and the fourth ratio is small is 0.

Figure 14:
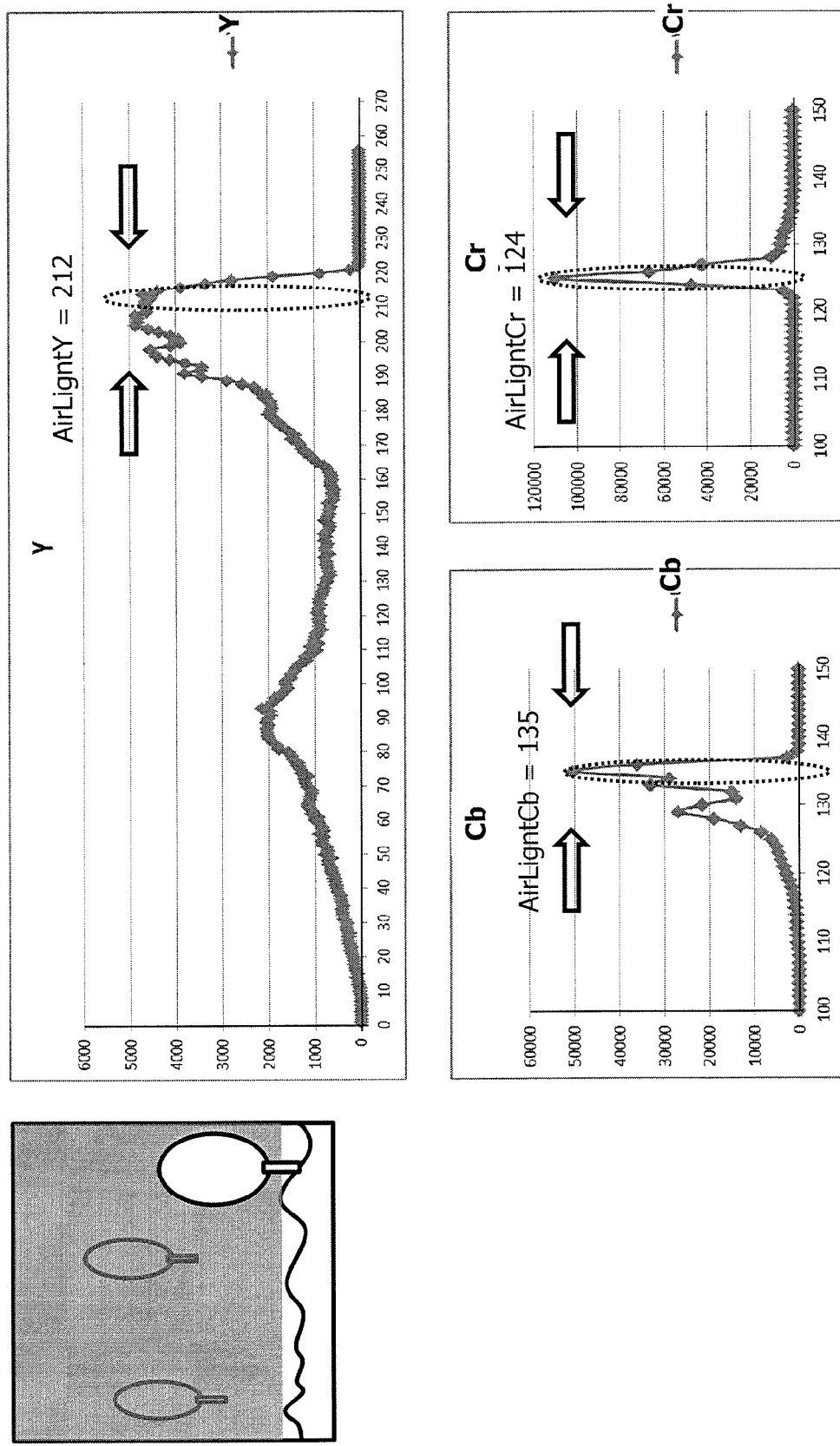

FIGS. 14 and 15 are diagrams depicting relation examples between the luminance Y and the color difference components Cb and Cr of an image including thick haze and an image without haze and luminance and color difference components of the air light of the image. FIG. 14 depicts histograms of the luminance Y and the color difference components Cb and Cr of pixels of an image P2-1 including thick haze and values of luminance AirLightY and color difference components AirLightCb and AirLightCr of the air light of the image P2-1. As it is evident from FIG. 14, in the case of the image P2-1 including the thick haze, a luminance value on which the luminance Y of the pixels is concentrated is very close to the luminance AirLightY of the air light, and the color difference components Cb and Cr on which the color difference components Cb and Cr of the pixels are concentrated are very close to the color difference components AirLightCb and AirLightCr of the air light.

On the other hand, FIG. 15 depicts histograms of the luminance Y and the color difference components Cb and Cr of pixels of an image P2-2 without haze and values of the luminance AirLightY and the color difference components AirLightCb and AirLightCr of the air light of the image P2-2. The color difference components Cb and Cr of the pixels of the image P2-2 are close to AirLightCb and AirLightCr of the air light of the image P2-2 as in FIG. 14. However, pixels in which the luminance Y is close to the AirLightY of the air light are few.

According to FIGS. 14 and 15, it is understood that, according to the third haze image discrimination processing, in the image P2-1 including the thick haze, since differences between the color difference components Cb and Cr of the image and the color difference components AirLightCb and AirLightCr of the air light of the image are small and a difference between the luminance of the image and the luminance of the air light of the image is also small, it is determined that the degree ω of the haze is high and, in the image P2-2 without haze, since the difference between the luminance of the image and the luminance of the air light is large, the degree ω of the haze is discriminated as 0.

According to the third haze image discrimination processing PR-3, in the image hazing in blue of the input image P1-6, it is determined that the color difference components and the luminance of the pixels are close to the color difference components and the luminance of blue of the air light and therefore the degree ω of the haze is discriminated as High. That is, even if a large number of pixels of the input image is not gray, when a color and luminance of the pixels are close to the air light, it is correctly determined that haze is thick.

[Fourth Haze Image Discrimination Processing PR-4]

In fourth haze image discrimination processing PR-4, discrimination processing of the degree ω of haze is performed making use of the fact that, in an image having a high degree of haze, an edge component is smaller as the luminance of pixels of the image is closer to the luminance of the air light. That is, new luminance NewY(x) of pixels obtained by adding an edge component of an input image to a difference between the luminance Y(x) of the pixels of the input image and the luminance AirLightY of the air light is calculated. It is determined that the degree of the haze is high if there are a large number of pixels in which the new luminance NewY(x) is low and that the degree of the haze is low if there are a large number of pixels in which the new luminance NewY(x) is high.

Figure 16:
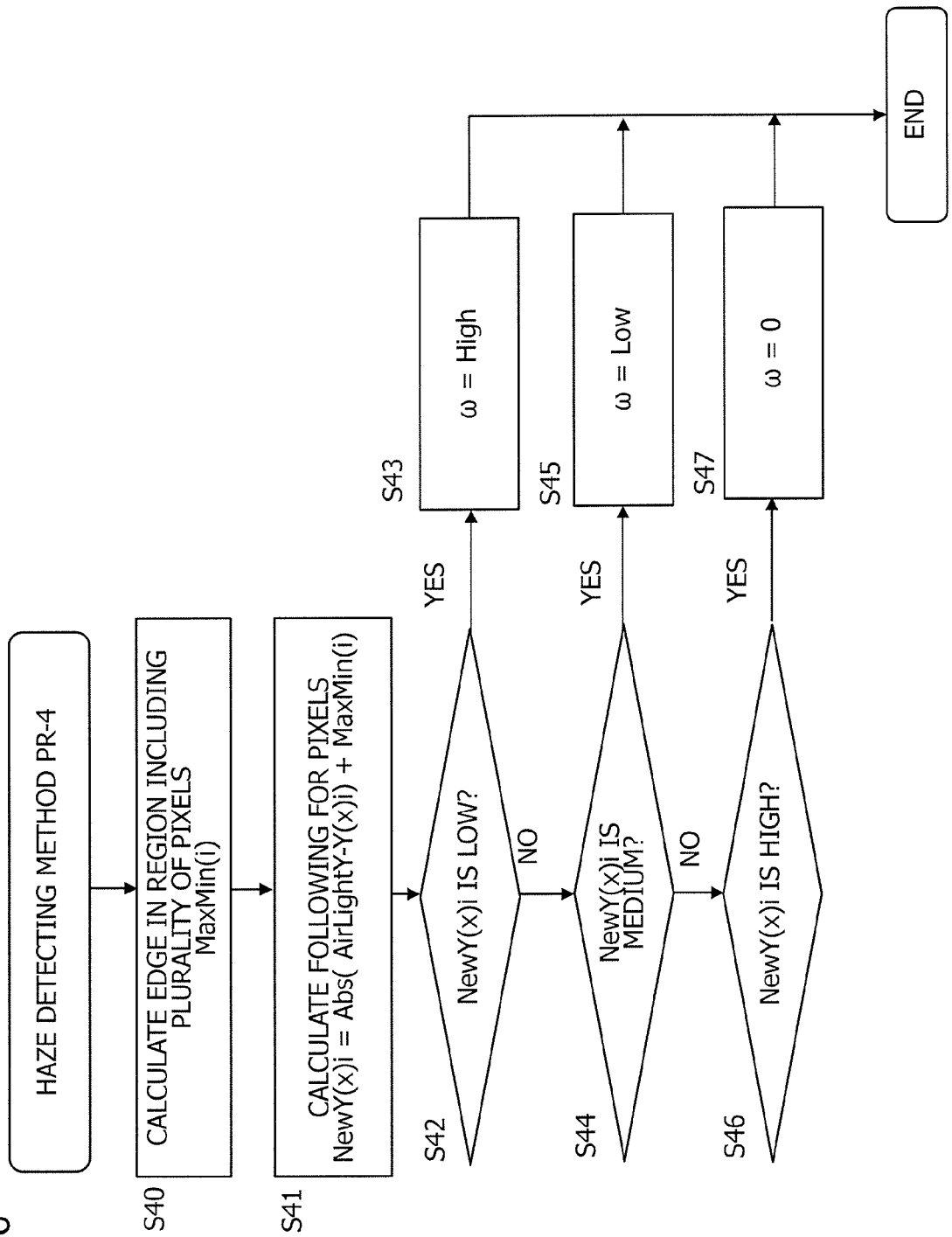
FIG. 16 is a flowchart of the fourth haze image discrimination processing PR-4.
Figure 17:
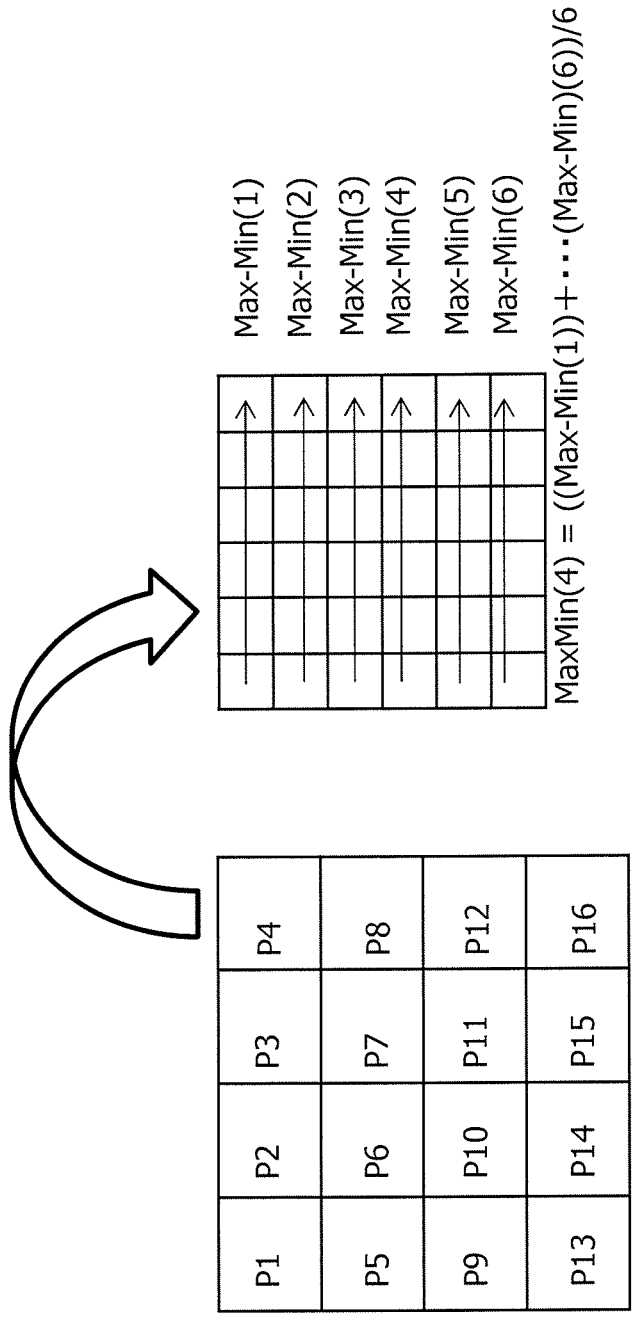

FIG. 16 is a flowchart of the fourth haze image discrimination processing PR-4. FIGS. 17 and 18 are diagrams for explaining processing in the flow chart of FIG. 16.

In the fourth haze image discrimination processing PR-4 in FIG. 16, first, an edge component in a region including a predetermined number of a plurality of pixels of an input image is calculated (S40). As depicted in FIG. 17, the input image is divided into, for example, 4×4 regions P1 to P16. For example, when the region P4 includes thirty-six pixels in 6 rows and 6 columns, differences Max−Min (1) to (6) of maximums Max and minimums Min of luminances in the respective rows are calculated. An average of the differences Max−Min is set as an edge component MaxMin(4) of the region P4. Edge components are calculated in the same manner for the other regions. In an image including thicker haze, the edge component is smaller. In an image without haze, since an edge clearly appears, the edge component is large.

Further, in this embodiment, rather than simply calculating an edge component between adjacent pixels, an average of differences between maximum luminance values and minimum luminance values in a region including a plurality of pixels is set as the edge component. Consequently, it is possible to determine not only whether an edge component between a part of pixels is large but also tendency concerning whether an edge component is large or small in a relatively wide region.

In FIG. 18, an example of a value of the edge component MaxMin calculated for each of the regions explained with reference to FIG. 17 and an example of an image having the new luminance NewY(x) of the following expression (11) are depicted with respect to an example of the images P2-1 and P1-4.

$$NewY(x)i = Abs(AirLightY - Y(x)i) + MaxMin(i) \quad (11)$$

In the embodiment, the new luminance NewY(x) of the expression (11) is calculated for each region of the image (S41).

In image P2-1, haze is thick and the value of the edge component MaxMin is generally small. Therefore, the upper half of the image having the new luminance NewY(x) of the image P2-1 is a dark image having low luminance NewY(x). Conversely, in the image P1-4, haze is absent and the value of the edge component MaxMin is generally high in the entire image. Therefore, in the image P1-4, the image having the new luminance NewY(x) is a bright image having high luminance NewY(x) in the entire image.

As explained above, the difference Abs(AirLightY−Y(x)i) between the luminance of the pixels of the input image and the luminance of the air light is closer to 0 as the haze is thicker. The value of the edge component MaxMin(i) is closer to 0 as the haze is thicker. This is because, when the haze is thin, contrast of the image increases and the edge component increases.

Referring back to FIG. 16, in the fourth haze image discrimination processing PR-4, when a new luminance NewY(x)i of Expression (11) is low, the degree ω of the haze is discriminated as High (YES in S42 and S43). When the new luminance NewY(x)i is a medium degree, the degree ω of the haze is discriminated as Low (YES in S44 and S45). When the new luminance NewY(x)i is large, the degree ω of the haze is discriminated as 0 (YES in S46 and S47).

As a result, in the image P1-4 and the image P1-5 depicted in FIG. 18, according to the third haze image discrimination processing PR-3, a color of a white car in the images is discriminated as the air light. The color difference components Cr and Cb of gray of the most portion in the image and a color difference component of white of the air light are close. The luminance of the image and the luminance of the air light are not so different. Therefore, it is determined that the haze is partially present (ω=Low). On the other hand, according to the fourth haze image discrimination processing PR-4, since the edge component of the image is high, the new luminance NewY(x) is high and it is determined that haze is absent. The degree ω of the haze is correctly discriminated as ω=0.

[Fifth Haze Image Discrimination Processing PR-5]

In fifth haze image discrimination processing, in addition to the characteristic that, in an image including a lot of haze, color difference components of pixels of the image are close to the color difference components of the air light, discrimination is also performed on the basis of how, in pixels having close color differences, luminances of the pixels are different from the luminance of the air light AirLight. That is, a ratio of the number of pixels satisfying a condition of Expression (12) described below to a total number of pixels is calculated.

$$Abs(AirLightCb - Cb(i)) + Abs(AirLightCr - Cr(i)) < ThCbCr \text{ and}$$

$$Abs(AirLightY - Y(i)) < AirLightY/2 \quad (12)$$

AirLightY/2 is a luminance value of about a half of the luminance AirLightY of the air light. Therefore, a condition is that Abs(AirLightY−Y(i)) is smaller than about a half of the luminance of the air light.

Figure 19:
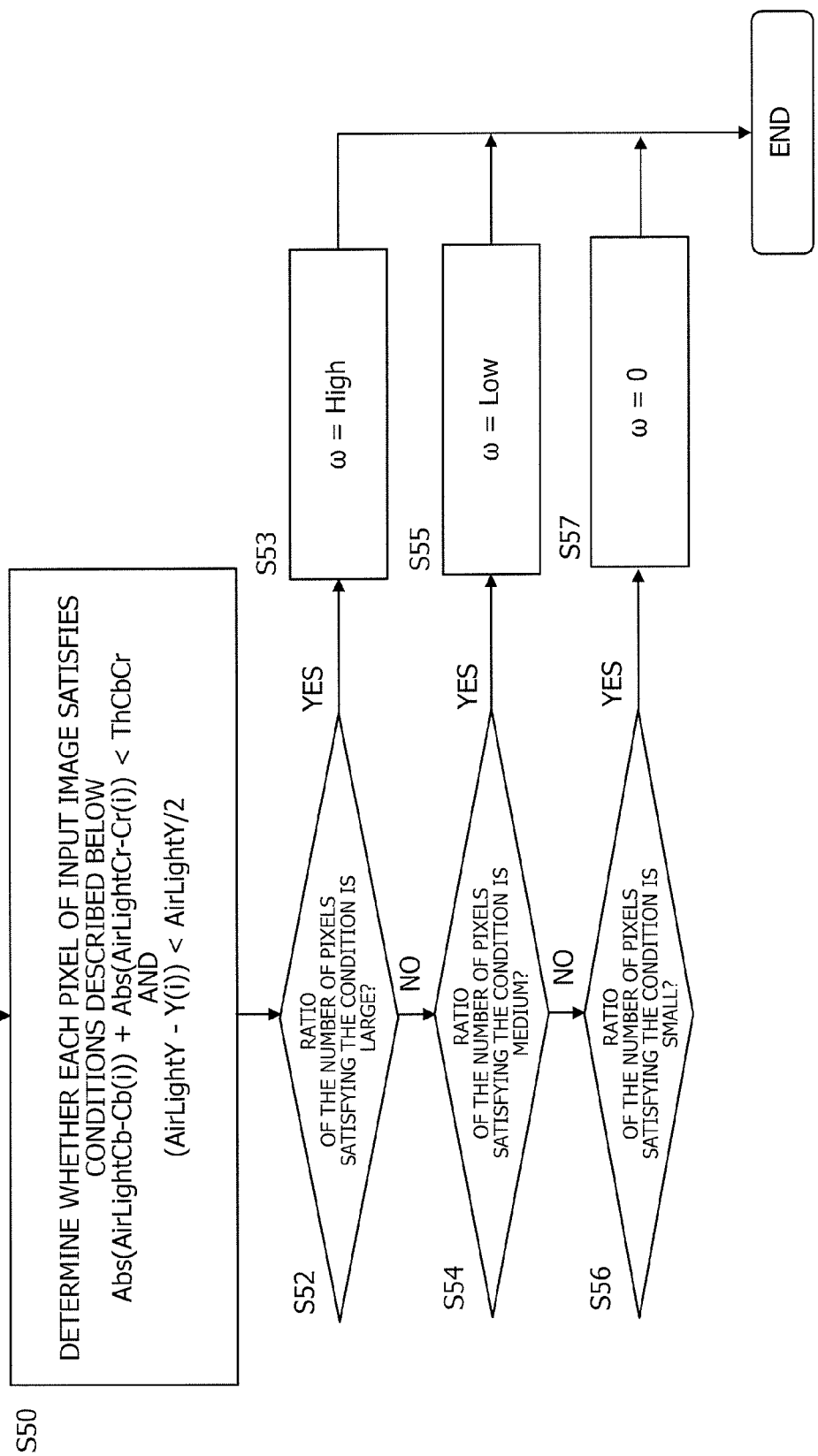
FIG. 19 is a flowchart of the fifth haze image discrimination processing PR-5.

FIG. 19 is a flowchart of the fifth haze image discrimination processing PR-5. According to the flowchart, in the fifth haze image discrimination processing PR-5, it is determined whether the condition of Expression (12) are satisfied (S50). When the ratio of the number of pixels satisfying the condition is large, the degree ω of the haze is discriminated as High (YES in S52 and S53). When the ratio of the number of pixels satisfying the condition is a medium degree, the degree ω of the haze is discriminated as Low (YES in S54 and S55). When the ratio of the number of pixels satisfying the condition is small, the degree ω of the haze is discriminated as 0 (YES in S57 and S58).

In the third haze image discrimination processing (FIG. 13), the ratios of the numbers of pixels respectively satisfying Expressions (9) and (10) are individually calculated. When both of the ratios are large, it is determined that the degree of the haze is high. On the other hand, in the fifth haze image discrimination processing, concerning pixels having color difference components close to the color difference components of the air light, it is further determined whether a difference between the luminance of the pixels and the luminance of the air light is smaller than about a half of the luminance of the air light.

The meaning of determining the second condition of Expression (12), whether the difference between the luminance of the pixels and the luminance of the air light is smaller than the half of the luminance of the air light is as explained below.

FIG. 20 is a diagram depicting three images with haze in which the permeability of the image P1-7 is changed. In FIG. 20, an expression same as Expression (1) described below is depicted.

$$I(x)=J(x)t(x)+\text{AirLight}(1-t(x)) \quad (1)$$

In the expression in FIG. 20, I(x) is replaced with L, J(x) is replaced with L0, AirLight is replaced with Lf(AirLight), and t(x) is replaced with $e^{-kd}$. The expression is depicted as described below.

$$L=L0*e^{-kd}+Lf(\text{AirLight})*(1-e^{-kd}) \quad (13)$$

The three images with haze in FIG. 20 are images L with haze in which opacity $(1-e^{-kd})$ is changed to 0.3, 0.5, and 0.8. When visually discriminating, in an experiment, which image was a boundary of an image with haze, it was determined that an image having opacity $(1-e^{-kd})$ or permeability $e^{-kd}$ of 0.5 is the image of the boundary. Therefore, concerning the three images with haze in FIG. 20, Expression (13) is as described below.

$$P1\text{-}7(1): L=L0*0.7+Lf*0.3 \text{ (without haze)}$$

$$P1\text{-}7(2): L=L0*0.5+Lf*0.5 \text{ (a boundary of an image with haze)}$$

$$P1\text{-}7(3): L=L0*0.2+Lf*0.8 \text{ (with haze)}$$

Differences LfY–LY between luminance LfY of the air light and luminance LY of the image are respectively calculated as described below.

$$P1\text{-}7(1): LfY-LY=LfY-(L0Y*0.7+LfY*0.3)=0.7\,LfY-0.7\,L0Y$$

$$P1\text{-}7(2): LfY-LY=LfY-(L0Y*0.5+LfY*0.5)=0.5LfY-0.5L0Y$$

$$P1\text{-}7(3): LfY-LY=LfY-(L0Y*0.2+LfY*0.8)=0.2LfY-0.2L0Y$$

In the above description, when 0.7L0Y, 0.5L0Y, and 0.2L0Y of the second term on the right side are neglected because these values are small, the expressions are changed as described below.

$$P1\text{-}7(1): LfY-LY=0.7LfY \to 0.5LfY \text{ (without haze)}$$

$$P1\text{-}7(2): LfY-LY=0.5LfY \text{ (a boundary of an image with haze)}$$

$$P1\text{-}7(3): LfY-LY=0.8LfY<0.5LfY \text{ (with haze)}$$

It is understood from the above that, if the difference LfY–LY between the luminance of the image and the luminance of the air light is smaller than a half LfY/2 of the luminance of the air light (LfY–LY<0.5 LfY), it is possible to determine that the image is an image with haze and, if the difference LfY–LY is larger than the half LfY/2 (LfY–LY>0.5 LfY), it is possible to determine that the image is an image without haze.

Therefore, in the fifth haze image discrimination processing, it is possible to determine that the degree of the haze is higher as the number of pixels satisfying Expression (12) described above is larger. In the image P1-7, the bright sky and a gray road occupy a wide region. In such a case, since the luminance of the sky occupying the wide region is high, a difference between the luminance and the luminance of the air light is larger than the half of the air light. It is determined that the degree of the haze is low. In this way, in the image P1-7 in which there are a large number of gray pixels but a region having high luminance such as the bright sky is wide, the degree ω of the haze is discriminated as 0 by the fifth haze image discrimination processing.

Figure 21:
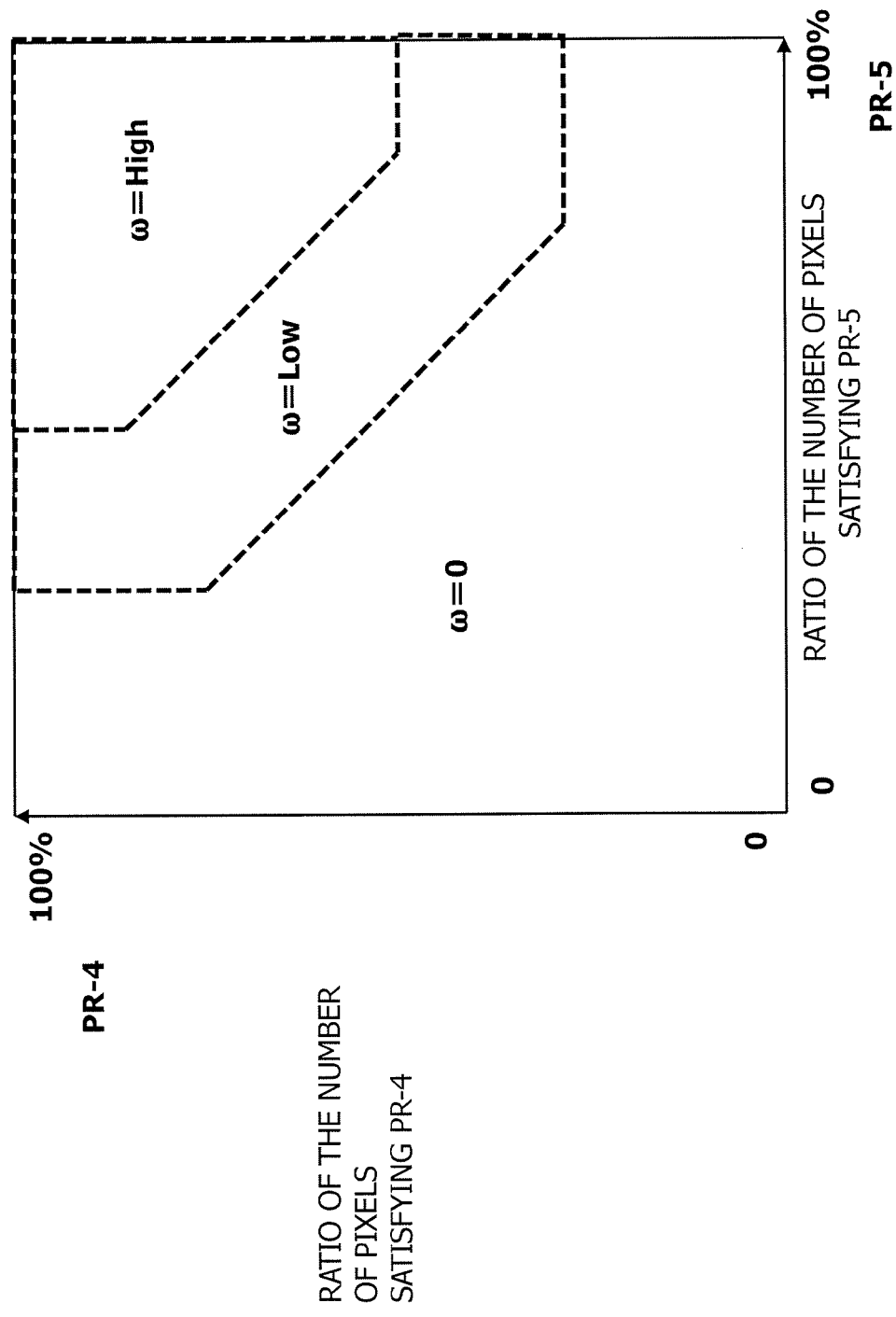
FIG. 21 is a diagram depicting processing for combining the fourth haze image discrimination processing PR-4 and the fifth haze image discrimination processing PR-5 and discriminating the degree ω of the haze.

FIG. 21 is a diagram depicting processing for combining the fourth haze image discrimination processing PR-4 and the fifth haze image discrimination processing PR-5 and discriminating the degree ω of the haze. In FIG. 21, the abscissa indicates a ratio of the number of pixels satisfying the condition (Expression (12)) by the fifth haze image discrimination processing and the ordinate indicates a ratio of the number of pixels satisfying the condition (Expression (11) is small) by the fourth haze image discrimination processing. The degree ω of the haze of an image in which both the ratios are high is discriminated as High, the degree ω of the haze of an image in which both the ratios are a medium degree is discriminated as Low, and the degree ω of the haze of an image in which both the ratios are low is discriminated as 0.

As explained above, the ratios of the numbers of pixels by the fourth haze image discrimination processing and the fifth haze image discrimination processing are plotted on the ordinate and the abscissa and discriminated. Consequently, it is possible to perform more highly accurate discrimination of the degree ω of the haze.

The discrimination by the first haze image discrimination processing and the second haze image discrimination processing, the third haze image discrimination processing, the fourth haze image discrimination processing and the fifth haze image discrimination processing, and the combined discrimination processing of the fourth haze image discrimination processing and the fifth haze image discrimination processing are performed in combination or independently as appropriate. Consequently, it is possible to discriminate degrees of haze of various images.

However, although a processing amount of the first haze image discrimination processing and the second haze image discrimination processing is relatively light, a processing amount of the third haze image discrimination processing and the fifth haze image discrimination processing is relatively heavy because the luminance and the color difference components are used for determination concerning the air light. In the fourth haze image discrimination processing, a processing amount becomes heavy because the edge component is calculated. Therefore, there is a tradeoff in that, when the accuracy of the haze image discrimination processing is increased, a processing amount becomes heavy because of the increase in the accuracy. Haze image discrimination processing having accuracy suitable for optimum costs needs to be adopted.

According to the aspect, it is possible to discriminate the degree of the haze by analyzing the picked-up image.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A haze image discriminating apparatus comprising:
   a first calculator configured to calculate a difference between a color difference component of an image signal of each of a plurality of pixels included in an image and a gray value, and calculate a first ratio of pixels in which the difference is lower than a first reference value, to the plurality of pixels;
   a second calculator configured to calculate a second ratio of pixels in which a luminance component of the pixel signal of each of the plurality of pixels is lower than a second reference value, to the plurality of pixels; and
   a haze-degree determining unit configured to determine that a degree of haze of the image becomes higher as the first ratio is higher and the second ratio is lower.

2. The haze image discriminating apparatus according to claim 1, further comprising:
   a third calculator configured to calculate a third ratio of pixels in which a difference between the color difference component of the pixel signal of each of the plurality of pixels and a color difference component of air light in the image is lower than a third reference value, to the plurality of pixels; and
   a fourth calculator configured to calculate a fourth ratio of pixels in which a difference between the luminance component of the pixel signal of each of the plurality of pixels and a luminance component of the air light is lower than a fourth reference value, to the plurality of pixels, wherein
   the haze-degree determining unit configured to determine that the degree of the haze of the image signal becomes higher as the third ratio is higher and the fourth ratio is higher.

3. The haze image discriminating apparatus according to claim 2, wherein the third calculator configured to generate a signal of the air light on the basis of a pixel signal having a maximum luminance value among a plurality of pixel signals of the image.

4. The haze image discriminating apparatus according to claim 2, wherein the haze-degree determining unit configured to determine that the degree of the haze becomes higher as a sum of an edge component of the image and a luminance difference, which is a difference between the luminance component of the pixel signal and a luminance component of air light in the image, is lower.

5. The haze image discriminating apparatus according to claim 4, wherein the haze-degree determining unit configured to determine that the degree of the haze is high when a difference between the color difference component of the pixel signal and a color difference component of air light in the image is lower than a fifth reference value, and a difference between the luminance component of the pixel signal and a luminance component of the air light is lower than the luminance component of the air light being multiplied by a coefficient, the coefficient being less than 1.

6. The haze image discriminating apparatus according to claim 2, wherein the haze-degree determining unit configured to determine that the degree of the haze is high when a difference between the color difference component of the pixel signal and a color difference component of air light in the image is lower than a fifth reference value, and a difference between the luminance component of the pixel signal and a luminance component of the air light is lower than the luminance component of the air light being multiplied by a coefficient, the coefficient being less than 1.

7. The haze image discriminating apparatus according to claim 2, further comprising:
   a sixth calculator configured to calculate a sixth ratio of pixels in which a sum of an edge component of the image and a luminance difference, which is a difference between the luminance component of the pixel signal and a luminance component of air light in the image, is lower than a sixth reference value, to the plurality of pixels; and
   a seventh calculator configured to calculate a seventh ratio of pixels in which a difference between the color difference component of the pixel signal and a color difference component of air light in the image is lower than a fifth reference value and a difference between the luminance component of the pixel signal and the luminance component of the air light is lower than the luminance component of the air light being multiplied by a coefficient, the coefficient being less than 1, to the plurality of pixels, wherein
   the haze-degree determining unit configured to determine that the degree of the haze of the image signal becomes higher as the sixth ratio is higher and the seventh ratio is higher.

8. The haze image discriminating apparatus according to claim 1, wherein the haze-degree determining unit configured to determine that the degree of the haze becomes higher as a sum of an edge component of the image and a luminance difference, which is a difference between the luminance component of the pixel signal and a luminance component of air light in the image, is lower.

9. The haze image discriminating apparatus according to claim 8, wherein the haze-degree determining unit configured to determine that the degree of the haze is high when a difference between the color difference component of the pixel signal and a color difference component of air light in the image is lower than a fifth reference value, and a difference between the luminance component of the pixel signal and a luminance component of the air light is lower than the luminance component of the air light being multiplied by a coefficient, the coefficient being less than 1.

10. The haze image discriminating apparatus according to claim 1, wherein the haze-degree determining unit configured to determine that the degree of the haze is high when a difference between the color difference component of the pixel signal and a color difference component of air light in the image is lower than a fifth reference value, and a difference between the luminance component of the pixel signal and a luminance component of the air light is lower than the luminance component of the air light being multiplied by a coefficient, the coefficient being less than 1.

11. The haze image discriminating apparatus according to claim 1, further comprising:
    a sixth calculator configured to calculate a sixth ratio of pixels in which a sum of an edge component of the image and a luminance difference, which is a difference between the luminance component of the pixel signal and a luminance component of air light in the image, is lower than a sixth reference value, to the plurality of pixels; and
    a seventh calculator configured to calculate a seventh ratio of pixels in which a difference between the color difference component of the pixel signal and a color difference component of air light in the image is lower than a fifth reference value and a difference between the luminance component of the pixel signal and the luminance component of the air light is lower than the luminance component of the air light being multiplied by a coefficient, the coefficient being less than 1, to the plurality of pixels, wherein the haze-degree determining unit configured to determine that the degree of the haze of the image signal becomes higher as the sixth ratio is higher and the seventh ratio is higher.

12. A haze image discriminating apparatus, comprising:

a third calculator configured to calculate a third ratio of pixels in which a difference between a color difference component of a pixel signal of each of a plurality of pixels included in an image and a color difference component of air light in the image is lower than a third reference value, to the plurality of pixels;

a fourth calculator configured to calculate a fourth ratio of pixels in which a difference between a luminance component of the pixel signal of each of the plurality of pixels and a luminance component of the air light is lower than a fourth reference value, to the plurality of pixels; and a haze-degree determining unit configured to determine that a degree of haze of the image signal becomes higher as the third ratio is higher and the fourth ratio is higher.

13. A haze image discriminating method comprising:

calculating a first ratio of pixels in which a difference between a color difference component of an image signal of each of a plurality of pixels included in an image and a gray value is lower than a first reference value, to the plurality of pixels;

calculating a second ratio of pixels in which a luminance component of the pixel signal of each of the plurality of pixels is lower than a second reference value, to the plurality of pixels; and determining that a degree of haze of the image becomes higher as the first ratio is higher and the second ratio is lower.

* * * * *